US012440762B2

(12) United States Patent
Sato et al.

(10) Patent No.: US 12,440,762 B2
(45) Date of Patent: Oct. 14, 2025

(54) STORAGE MEDIUM, INFORMATION PROCESSING SYSTEM, AND GAME PROCESSING METHOD

(71) Applicant: NINTENDO CO., LTD., Kyoto (JP)

(72) Inventors: Yuya Sato, Kyoto (JP); Yuya Tokaji, Tokyo (JP)

(73) Assignee: Nintendo Co., Ltd., Kyoto (JP)

( * ) Notice: Subject to any disclaimer, the term of this patent is extended or adjusted under 35 U.S.C. 154(b) by 272 days.

(21) Appl. No.: 18/356,586

(22) Filed: Jul. 21, 2023

(65) Prior Publication Data

US 2024/0082726 A1 Mar. 14, 2024

(30) Foreign Application Priority Data

Sep. 12, 2022 (JP) ................................ 2022-144905

(51) Int. Cl.
*A63F 13/56* (2014.01)
*A63F 13/44* (2014.01)

(52) U.S. Cl.
CPC .............. *A63F 13/56* (2014.09); *A63F 13/44* (2014.09)

(58) Field of Classification Search
CPC .......... A63F 13/25; A63F 13/44; A63F 13/45; A63F 13/52; A63F 13/55; A63F 13/70; A63F 13/56; A63F 2300/57; A63F 2300/60; A63F 2300/63; A63F 2300/638; A63F 2300/65; A63F 2300/6623
See application file for complete search history.

(56) References Cited

U.S. PATENT DOCUMENTS

2008/0125224 A1* 5/2008 Pollatsek .............. A63F 13/428 463/43
2008/0227543 A1* 9/2008 Kawase .................. A63F 13/10 463/31
2012/0324385 A1* 12/2012 Johnston ................. A63F 13/56 715/765
2018/0147489 A1 5/2018 Shirakami et al.
2020/0286288 A1* 9/2020 Deng ...................... G06T 19/00
(Continued)

FOREIGN PATENT DOCUMENTS

JP 2008-220782 9/2008
JP 2009-112652 5/2009
(Continued)

*Primary Examiner* — Omkar A Deodhar
(74) *Attorney, Agent, or Firm* — Nixon & Vanderhye PC

(57) ABSTRACT

An example of an information processing system, when a player character is positioned at least on the ground, moves a non-player character being an ally of the player character in a virtual space. When the player character is positioned on the ground, the information processing system executes a first control associated with a predetermined character being the non-player character, according to an operation input including an input that is performed in a state where a predetermined positional relationship, indicating that the predetermined character and the player character are near to each other, is satisfied. When the player character is positioned in the air, the information processing system executes a second control associated with the predetermined character, according to a third operation input of the user, regardless of the positional relationship between the predetermined character and the player character.

13 Claims, 19 Drawing Sheets

(56) References Cited

U.S. PATENT DOCUMENTS

| | | | | |
|---|---|---|---|---|
| 2020/0368622 | A1 | 11/2020 | Kando et al. | |
| 2022/0152502 | A1* | 5/2022 | Abe | A63F 13/56 |
| 2022/0258056 | A1* | 8/2022 | Jiang | A63F 13/56 |
| 2023/0068653 | A1* | 3/2023 | Yao | A63F 13/426 |
| 2023/0351717 | A1* | 11/2023 | Ye | A63F 13/5375 |

FOREIGN PATENT DOCUMENTS

| | | |
|---|---|---|
| JP | 2015-216996 | 12/2015 |
| JP | 2018086085 A | 6/2018 |
| JP | 2020-188986 | 11/2020 |

* cited by examiner

STORAGE MEDIUM, INFORMATION PROCESSING SYSTEM, AND GAME PROCESSING METHOD

CROSS REFERENCE TO RELATED APPLICATION

This application claims priority to Japanese Patent Application No. 2022-144905, filed on Sep. 12, 2022, the entire contents of which are incorporated herein by reference.

FIELD

The present disclosure relates to a storage medium, an information processing system, and a game processing method for controlling a player character and non-player characters in a game.

BACKGROUND AND SUMMARY

Conventionally, there is a technology for controlling a player character and a non-player character in a game. In such a technology, when the player character moves, the non-player character is moved together with the player character, and when the player character stops, the non-player character is also stopped. In addition, when the player character is not operated by a user, the player character is automatically moved so as to approach the non-player character present near the player character, and is caused to perform a motion on the non-player character.

In the above technology, it is sometimes difficult for the user to cause a desired non-player character to perform a motion when the user operates the player character. In addition, a case where the player character is positioned in the air is not supposed, and therefore, there is room for improvement in easily performing an operation for causing the non-player character to perform a motion in such a case.

Therefore, the present application discloses a storage medium, an information processing system, and a game processing method that allow the user to easily perform an operation for causing a non-player character to perform a motion when the user operates a player character moving on the ground and in the air.

(1)

An example of a non-transitory computer-readable storage medium described herein stores instructions that, when executed, cause a processor of an information processing apparatus to execute game processing. The instructions comprises: moving a player character on the ground and in the air in a virtual space, according to a first operation input of a user; when the player character is positioned at least on the ground, moving, in the virtual space, a non-player character being an ally of the player character; when the player character is positioned on the ground, executing a first control associated with a predetermined character being the non-player character, according to a second operation input including an input that is performed in a state where a predetermined positional relationship is satisfied, the predetermined positional relationship indicating that the predetermined character and the player character are near to each other; and when the player character is positioned in the air, executing a second control associated with the predetermined character, according to a third operation input of the user, regardless of the positional relationship between the predetermined character and the player character.

According to the configuration of the above (1), the user can select a non-player character that executes the first control, by moving the player character on the ground. Meanwhile, the user can cause the non-player character to execute the second control without moving the player character in the air. Thus, when operating the player character moving on the ground and in the air, the user can easily perform the operation of causing the non-player character to perform a motion.

(2)

The instructions, when executed, may further: move, in the virtual space, a plurality of non-player characters being allies of the player character and including the predetermined character; when the player character is positioned on the ground, execute a control associated with one non-player character among the plurality of non-player characters, according to the second operation input performed in a state where a predetermined positional relationship is satisfied, the predetermined positional relationship indicating that the one non-player character and the player character are near to each other; and when the player character is positioned in the air, not execute a control associated with another non-player character different from the predetermined character even if the second operation input is performed.

According to the configuration of the above (2), the plurality of non-player characters can be controlled when the player character is positioned on the ground, and the control for the predetermined character can be easily executed when the player character is positioned in the air.

(3)

The instructions, when executed, processor may further: when the player character is positioned on the ground, move each of the plurality of non-player characters according to the position of the player character; and when the player character is positioned in the air, move the predetermined character according to the position of the player character, and not have to move non-player characters, of the plurality of non-player characters, other than the predetermined character according to the position of the player character.

According to the configuration of the above (3), the player is allowed to easily know the non-player character capable of performing the control in the air. In addition, rationality can be given to the fact that the another non-player character is incapable of executing the control in the air, thereby reducing the possibility that the player feels discomfort.

(4)

The second control may be a control having an influence on movement of the player character in the air.

According to the configuration of the above (4), the user can easily perform the operation of moving the player character in the air.

(5)

In the air, the player character may be able to enter a first falling state, and a second falling state in which the player character falls at a velocity lower than that in the first falling state and moves by a larger amount in a horizontal direction in the game space as compared to the first falling state. When the player character is in the second falling state in the air, the player character may be controlled so as to move under the influence of the second control.

According to the configuration of the above (5), since the movement of the player character in the low-velocity falling state can be assisted by the second control, the second control can be effectively used in the air.

(6)

Execution of a new first control corresponding to the predetermined character may be allowed on condition that a predetermined time elapses from execution of the first control or the second control. Execution of a new second control corresponding to the predetermined character may be allowed on condition that a predetermined time elapses from execution of the first control or the second control.

According to the configuration of the above (6), regardless of whether the player character is positioned on the ground or in the air, it is possible to inhibit the user from taking excessive advantage by executing the second control at high frequency.

(7)

The first control and the second control both may be a control for generating a movement force that moves an object.

According to the configuration of the above (7), since the first control and the second control provide the same kind of effects, the user can easily understand the effects of the first control and the second control, and can execute the first control and the second control without discomfort.

(8)

The instructions, when executed, processor may further: when the player character is positioned on the ground, not have to move the player character based on the movement force generated by the first control; and when the player character is positioned in the air, move the player character based on the movement force generated by the second control.

According to the configuration of the above (8), the second control allows the player to operate movement of the player character in the air, and reduces the possibility that the player character moves against the player's intention on the ground.

(9)

The first control may be a control for generating the movement force at a predetermined height with reference to the player character. The second control may be a control for generating the movement force at a height lower than the predetermined height with reference to the player character.

According to the configuration of the above (9), the movement force can be effectively given to the player character that is falling in the air.

(10)

The second operation input and the third operation input may both include an input to a predetermined operation part.

According to the configuration of the above (10), since the inputs for causing the first control and the second control are performed to the same operation part, the possibility of erroneous inputs of the user can be reduced.

(11)

The second operation input and the third operation input may both include two times of the input to the predetermined operation part.

According to the configuration of the above (11), since the same input method is used for causing the first control and the second control, the possibility of erroneous inputs of the user can be further reduced. In addition, since both the first control and the second control are executed by the second input, the possibility that the skill motion is executed against the user's intention can be reduced even if the user erroneously operates the operation part once.

The present specification discloses examples of an information processing apparatus and an information processing system that execute the processes in the above (1) to (11). Furthermore, the present specification discloses an example of a game processing method that executes the processes in the above (1) to (11).

According to the storage medium, the information processing system, or the game processing method described above, an operation of causing a non-player character to perform a motion can be easily performed when operating a player character moving on the ground and in the air.

These and other objects, features, aspects and advantages of the exemplary embodiment will become more apparent from the following detailed description when taken in conjunction with the accompanying drawings.

DETAILED DESCRIPTION OF NON-LIMITING EXAMPLE EMBODIMENTS

[1. Configuration of Game System]

A game system according to an example of an exemplary embodiment is described below. An example of a game system 1 according to the exemplary embodiment includes a main body apparatus (an information processing apparatus; which functions as a game apparatus main body in the exemplary embodiment) 2, a left controller 3, and a right controller 4. Each of the left controller 3 and the right controller 4 is attachable to and detachable from the main body apparatus 2. That is, the game system 1 can be used as a unified apparatus obtained by attaching each of the left controller 3 and the right controller 4 to the main body apparatus 2. Further, in the game system 1, the main body apparatus 2, the left controller 3, and the right controller 4 can also be used as separate bodies (see FIG. 2). Hereinafter, first, the hardware configuration of the game system 1 according to the exemplary embodiment is described, and then, the control of the game system 1 according to the exemplary embodiment is described.

Figure 1:
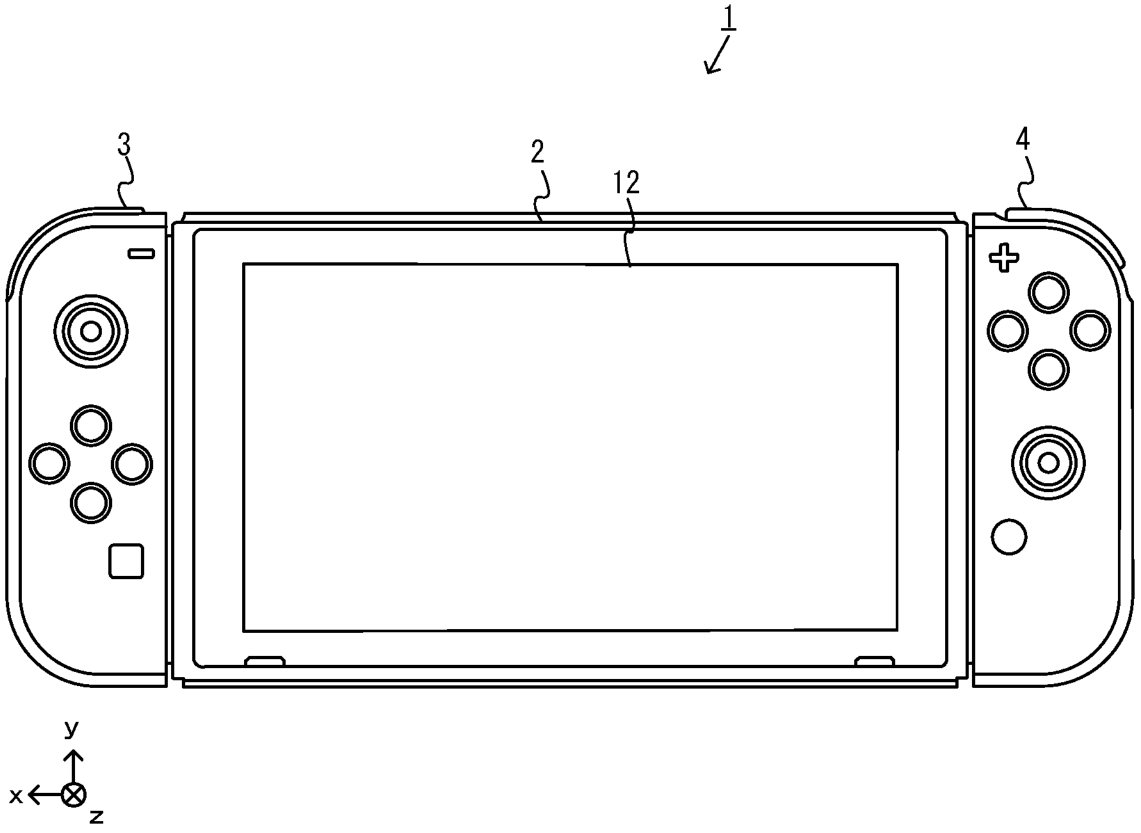
FIG. 1 is a view showing an example where a non-limiting left controller and a non-limiting right controller are attached to a non-limiting main body apparatus.

FIG. 1 is a diagram showing an example of the state where the left controller 3 and the right controller 4 are attached to the main body apparatus 2. As shown in FIG. 1, each of the left controller 3 and the right controller 4 is attached to and unified with the main body apparatus 2. The main body apparatus 2 is an apparatus for performing various processes (e.g., game processing) in the game system 1. The main body apparatus 2 includes a display 12. Each of the left controller 3 and the right controller 4 is an apparatus including operation sections with which a user provides inputs.

Figure 2:
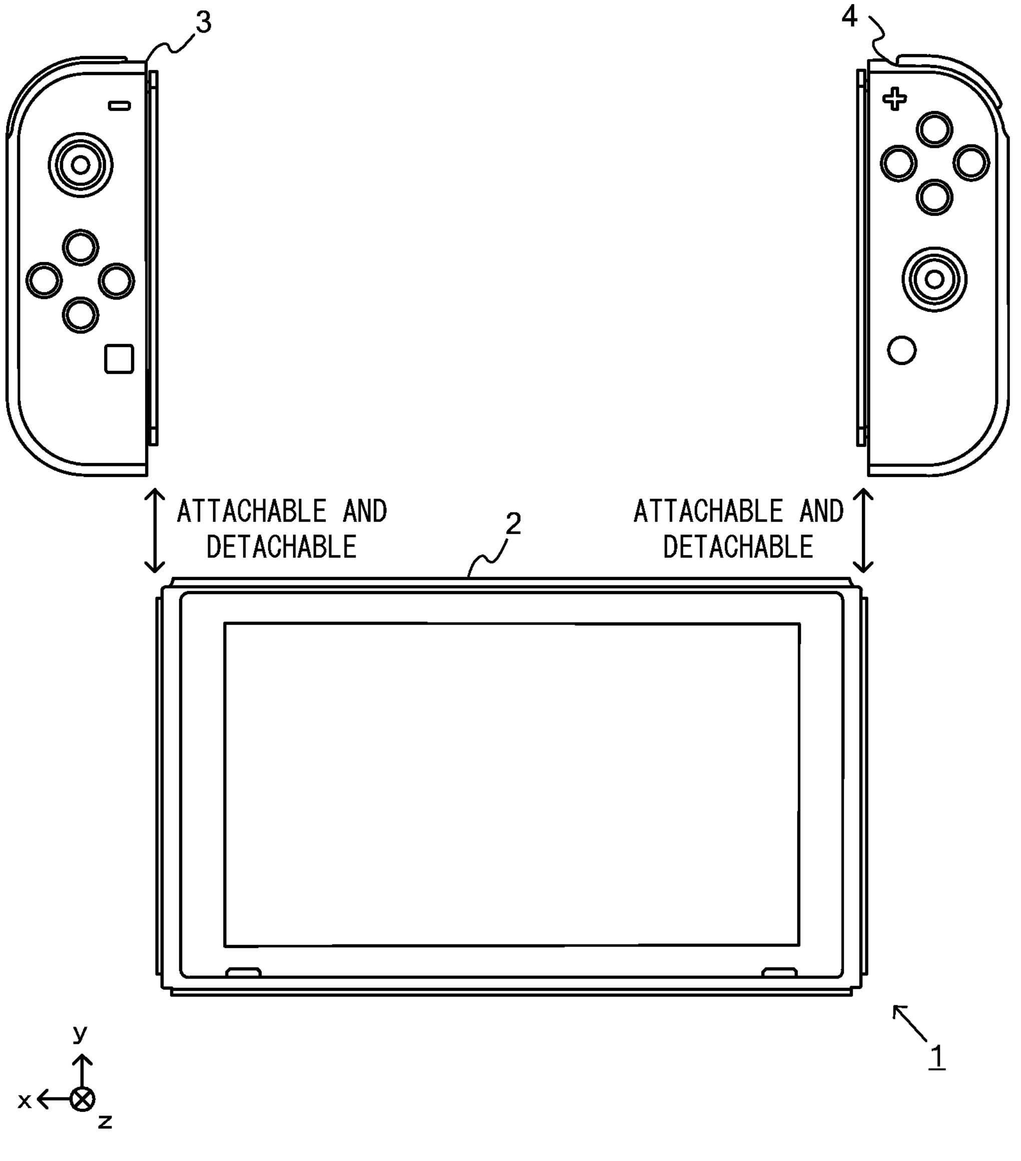
FIG. 2 is a view showing an example where a non-limiting left controller and a non-limiting right controller are removed from a non-limiting main body apparatus.

FIG. 2 is a diagram showing an example of the state where each of the left controller 3 and the right controller 4 is detached from the main body apparatus 2. As shown in FIGS. 1 and 2, the left controller 3 and the right controller 4 are attachable to and detachable from the main body apparatus 2. It should be noted that hereinafter, the left controller 3 and the right controller 4 will occasionally be referred to collectively as a “controller”.

Figure 3:
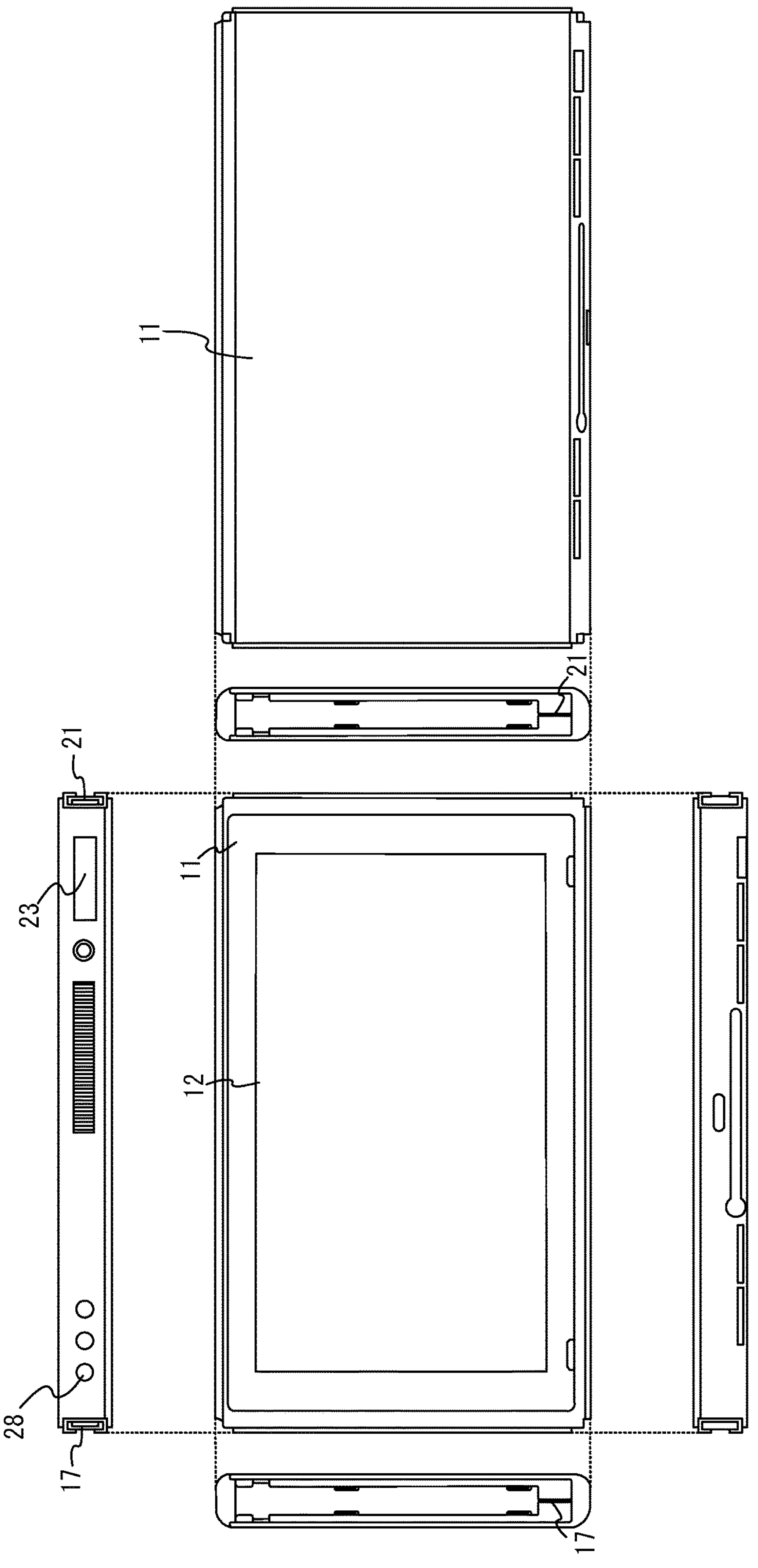
FIG. 3 is a six-sided view showing an example of a non-limiting main body apparatus.

FIG. 3 is six orthogonal views showing an example of the main body apparatus 2. As shown in FIG. 3, the main body apparatus 2 includes an approximately plate-shaped housing 11. In the exemplary embodiment, a main surface (in other words, a surface on a front side, i.e., a surface on which the display 12 is provided) of the housing 11 has a generally rectangular shape.

It should be noted that the shape and the size of the housing 11 are optional. As an example, the housing 11 may be of a portable size. Further, the main body apparatus 2 alone or the unified apparatus obtained by attaching the left controller 3 and the right controller 4 to the main body apparatus 2 may function as a mobile apparatus. The main body apparatus 2 or the unified apparatus may function as a handheld apparatus or a portable apparatus.

As shown in FIG. 3, the main body apparatus 2 includes the display 12, which is provided on the main surface of the housing 11. The display 12 displays an image generated by the main body apparatus 2. In the exemplary embodiment, the display 12 is a liquid crystal display device (LCD). The display 12, however, may be a display device of any type.

Further, the main body apparatus 2 includes a left terminal 17, which is a terminal for the main body apparatus 2 to perform wired communication with the left controller 3, and a right terminal 21, which is a terminal for the main body apparatus 2 to perform wired communication with the right controller 4.

As shown in FIG. 3, the main body apparatus 2 includes a slot 23. The slot 23 is provided on an upper side surface of the housing 11. The slot 23 is so shaped as to allow a predetermined type of storage medium to be attached to the slot 23. The predetermined type of storage medium is, for example, a dedicated storage medium (e.g., a dedicated memory card) for the game system 1 and an information processing apparatus of the same type as the game system 1. The predetermined type of storage medium is used to store, for example, data (e.g., saved data of an application or the like) used by the main body apparatus 2 and/or a program (e.g., a program for an application or the like) executed by the main body apparatus 2. Further, the main body apparatus 2 includes a power button 28.

Figure 4:
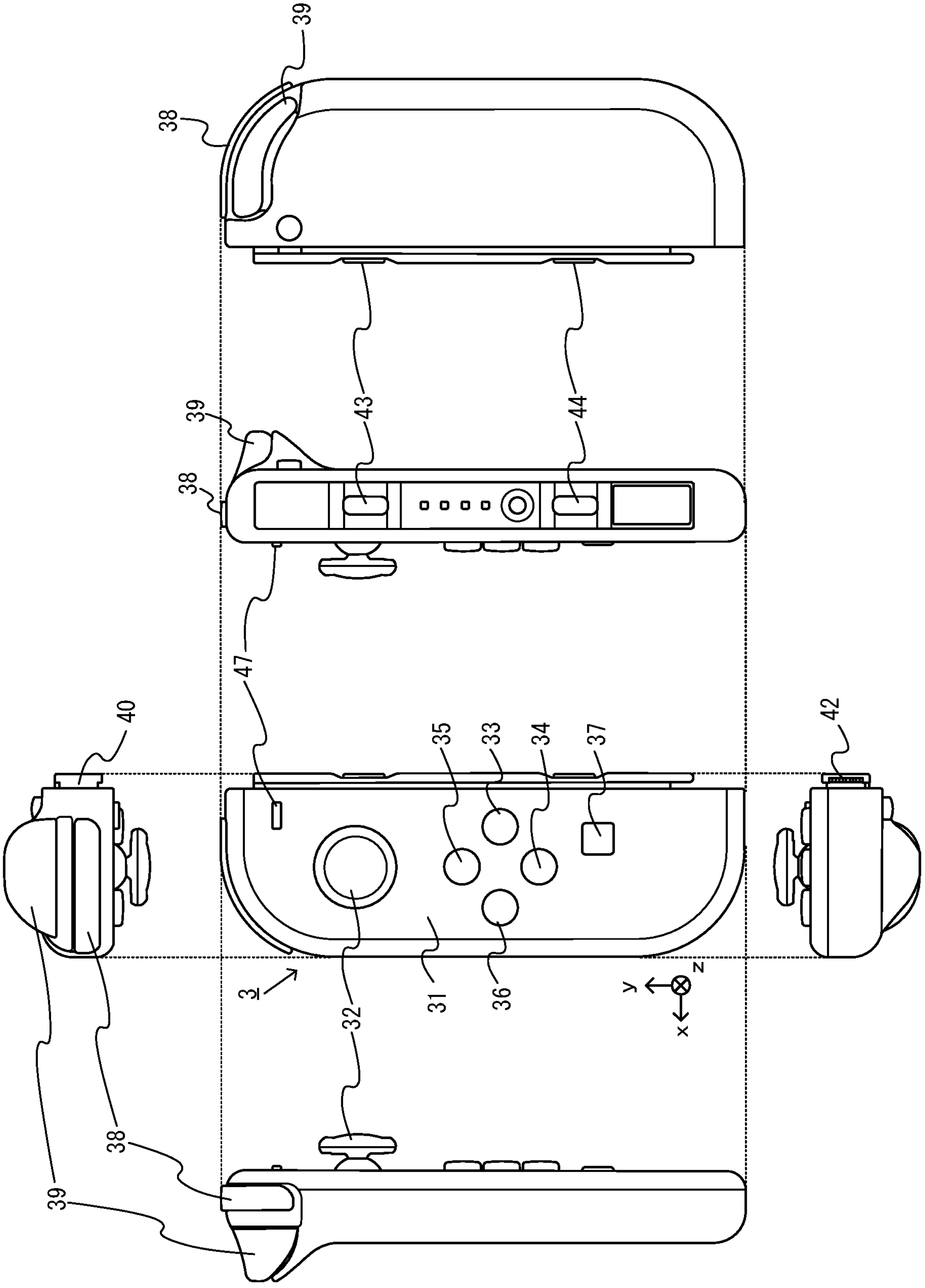
FIG. 4 is a six-sided view showing an example of a non-limiting left controller.

FIG. 4 is six orthogonal views showing an example of the left controller 3. As shown in FIG. 4, the left controller 3 includes a housing 31. In the exemplary embodiment, the housing 31 has a vertically long shape, i.e., is shaped to be long in an up-down direction (i.e., a y-axis direction shown in FIGS. 1 and 4). In the state where the left controller 3 is detached from the main body apparatus 2, the left controller 3 can also be held in the orientation in which the left controller 3 is vertically long. The housing 31 has such a shape and a size that when held in the orientation in which the housing 31 is vertically long, the housing 31 can be held with one hand, particularly the left hand. Further, the left controller 3 can also be held in the orientation in which the left controller 3 is horizontally long. When held in the orientation in which the left controller 3 is horizontally long, the left controller 3 may be held with both hands.

The left controller 3 includes an analog stick 32. As shown in FIG. 4, the analog stick 32 is provided on a main surface of the housing 31. The analog stick 32 can be used as a direction input section with which a direction can be input. The user tilts the analog stick 32 and thereby can input a direction corresponding to the direction of the tilt (and input a magnitude corresponding to the angle of the tilt). It should be noted that the left controller 3 may include a directional pad, a slide stick that allows a slide input, or the like as the direction input section, instead of the analog stick. Further, in the exemplary embodiment, it is possible to provide an input by pressing the analog stick 32.

The left controller 3 includes various operation buttons. The left controller 3 includes four operation buttons 33 to 36 (specifically, a right direction button 33, a down direction button 34, an up direction button 35, and a left direction button 36) on the main surface of the housing 31. Further, the left controller 3 includes a record button 37 and a “−” (minus) button 47. The left controller 3 includes a first L-button 38 and a ZL-button 39 in an upper left portion of a side surface of the housing 31. Further, the left controller 3 includes a second L-button 43 and a second R-button 44, on the side surface of the housing 31 on which the left controller 3 is attached to the main body apparatus 2. These operation buttons are used to give instructions depending on various programs (e.g., an OS program and an application program) executed by the main body apparatus 2.

Further, the left controller 3 includes a terminal 42 for the left controller 3 to perform wired communication with the main body apparatus 2.

Figure 5:
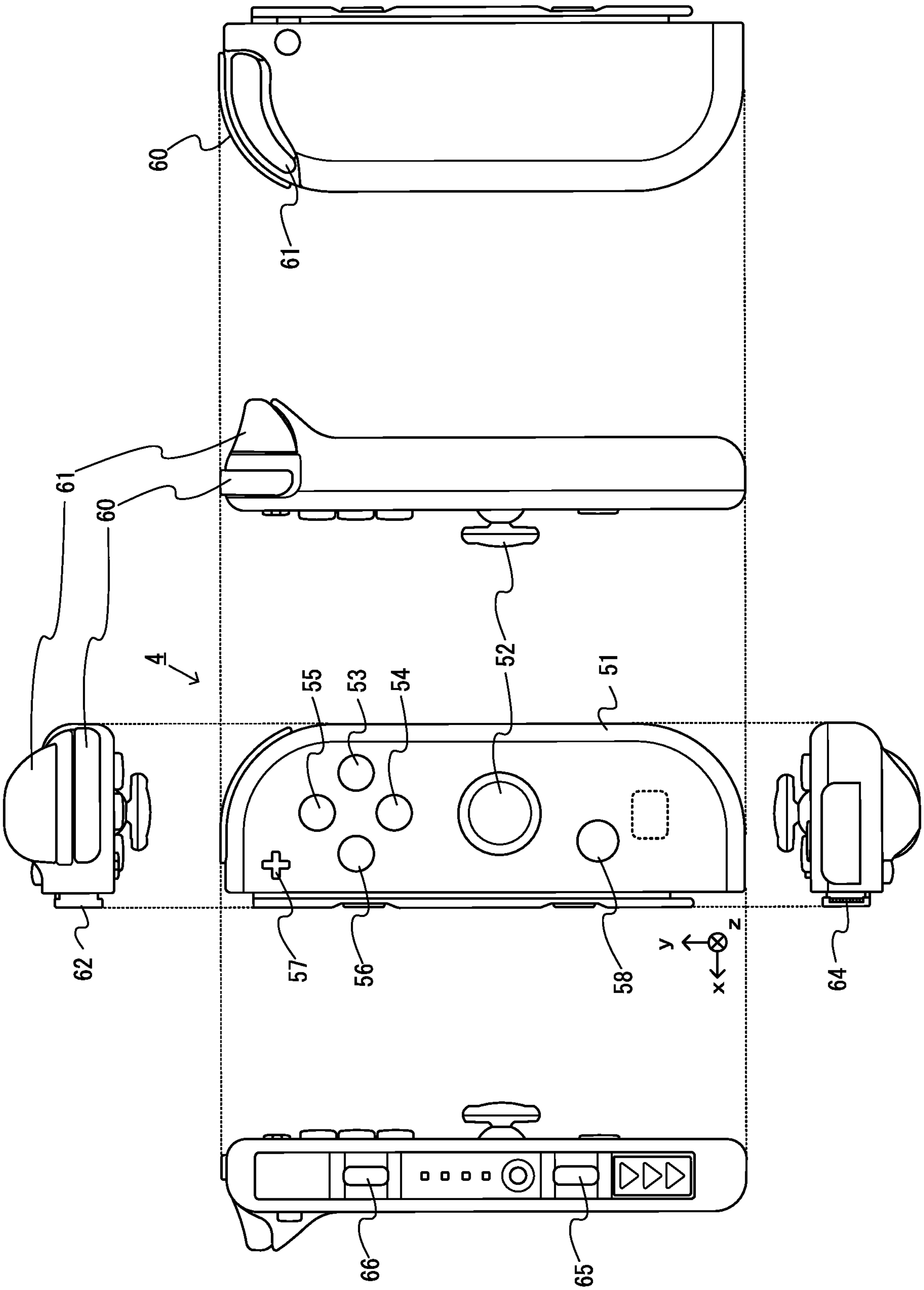
FIG. 5 is a six-sided view showing an example of a non-limiting right controller.

FIG. 5 is six orthogonal views showing an example of the right controller 4. As shown in FIG. 5, the right controller 4 includes a housing 51. In the exemplary embodiment, the housing 51 has a vertically long shape, i.e., is shaped to be long in the up-down direction. In the state where the right controller 4 is detached from the main body apparatus 2, the right controller 4 can also be held in the orientation in which the right controller 4 is vertically long. The housing 51 has such a shape and a size that when held in the orientation in which the housing 51 is vertically long, the housing 51 can be held with one hand, particularly the right hand. Further, the right controller 4 can also be held in the orientation in which the right controller 4 is horizontally long. When held in the orientation in which the right controller 4 is horizontally long, the right controller 4 may be held with both hands.

Similarly to the left controller 3, the right controller 4 includes an analog stick 52 as a direction input section. In the exemplary embodiment, the analog stick 52 has the same configuration as that of the analog stick 32 of the left controller 3. Further, the right controller 4 may include a directional pad, a slide stick that allows a slide input, or the like, instead of the analog stick. Further, similarly to the left controller 3, the right controller 4 includes four operation buttons 53 to 56 (specifically, an A-button 53, a B-button 54, an X-button 55, and a Y-button 56) on a main surface of the housing 51. Further, the right controller 4 includes a "+" (plus) button 57 and a home button 58. Further, the right controller 4 includes a first R-button 60 and a ZR-button 61 in an upper right portion of a side surface of the housing 51. Further, similarly to the left controller 3, the right controller 4 includes a second L-button 65 and a second R-button 66.

Further, the right controller 4 includes a terminal 64 for the right controller 4 to perform wired communication with the main body apparatus 2.

Figure 6:
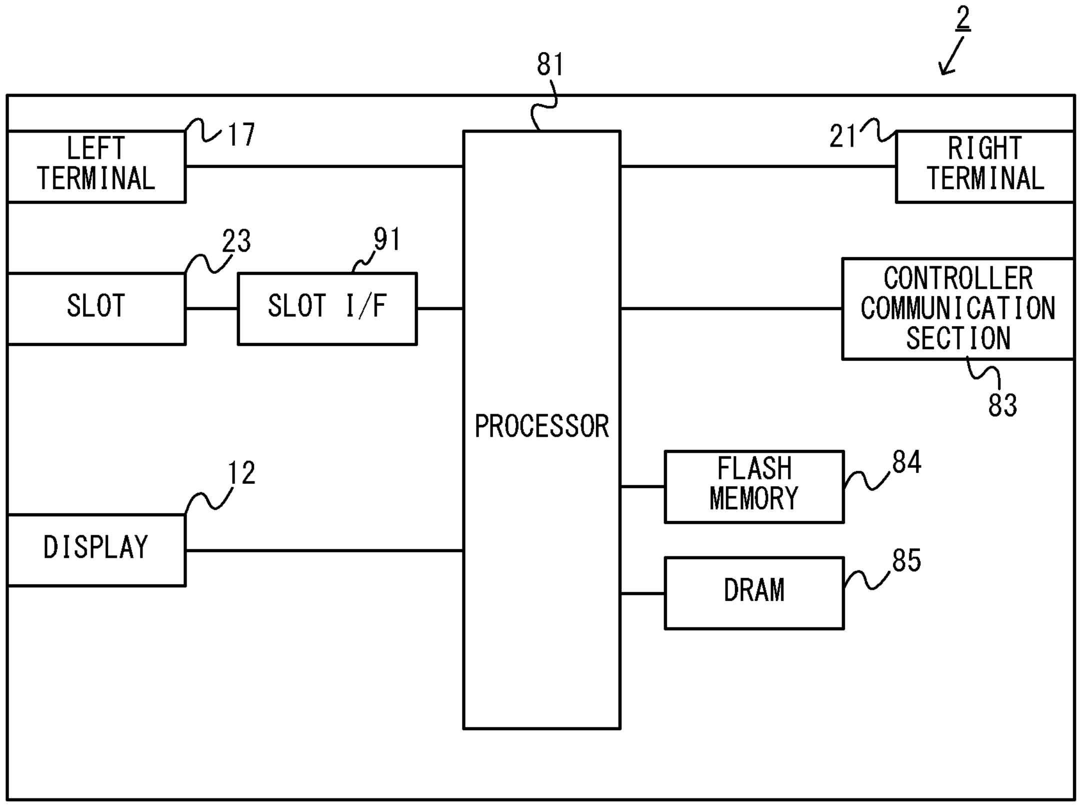
FIG. 6 is a block diagram showing an example of an internal configuration of a non-limiting main body apparatus.

FIG. 6 is a block diagram showing an example of the internal configuration of the main body apparatus 2. The main body apparatus 2 includes components 81, 83 to 85, and 91 shown in FIG. 6 in addition to the components shown in FIG. 3. Some of the components 81, 83 to 85, and 91 may be mounted as electronic components on an electronic circuit board and accommodated in the housing 11.

The main body apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 executes an information processing program (e.g., a game program) stored in a storage section (specifically, an internal storage medium such as a flash memory 84, an external storage medium attached to the slot 23, or the like), thereby performing the various types of information processing.

The main body apparatus 2 includes a flash memory 84 and a DRAM (Dynamic Random Access Memory) 85 as examples of internal storage media built into the main body apparatus 2. The flash memory 84 and the DRAM 85 are connected to the processor 81. The flash memory 84 is a memory mainly used to store various data (or programs) to be saved in the main body apparatus 2. The DRAM 85 is a memory used to temporarily store various data used for information processing.

The main body apparatus 2 includes a slot interface (hereinafter abbreviated as "I/F") 91. The slot OF 91 is connected to the processor 81. The slot OF 91 is connected to the slot 23, and in accordance with an instruction from the processor 81, reads and writes data from and to the predetermined type of storage medium (e.g., a dedicated memory card) attached to the slot 23.

The processor 81 appropriately reads and writes data from and to the flash memory 84, the DRAM 85, and each of the above storage media, thereby performing the above information processing.

The main body apparatus 2 includes a controller communication section 83. The controller communication section 83 is connected to the processor 81. The controller communication section 83 wirelessly communicates with the left controller 3 and/or the right controller 4. The communication method between the main body apparatus 2 and the left controller 3 and the right controller 4 is optional. In the exemplary embodiment, the controller communication section 83 performs communication compliant with the Bluetooth (registered trademark) standard with the left controller 3 and with the right controller 4.

The processor 81 is connected to the left terminal 17, and the right terminal 21. When performing wired communication with the left controller 3, the processor 81 transmits data to the left controller 3 via the left terminal 17 and also receives operation data from the left controller 3 via the left terminal 17. Further, when performing wired communication with the right controller 4, the processor 81 transmits data to the right controller 4 via the right terminal 21 and also receives operation data from the right controller 4 via the right terminal 21. As described above, in the exemplary embodiment, the main body apparatus 2 can perform both wired communication and wireless communication with each of the left controller 3 and the right controller 4.

Further, the display 12 is connected to the processor 81. The processor 81 displays a generated image (e.g., an image generated by executing the above information processing) and/or an externally acquired image on the display 12.

Figure 7:
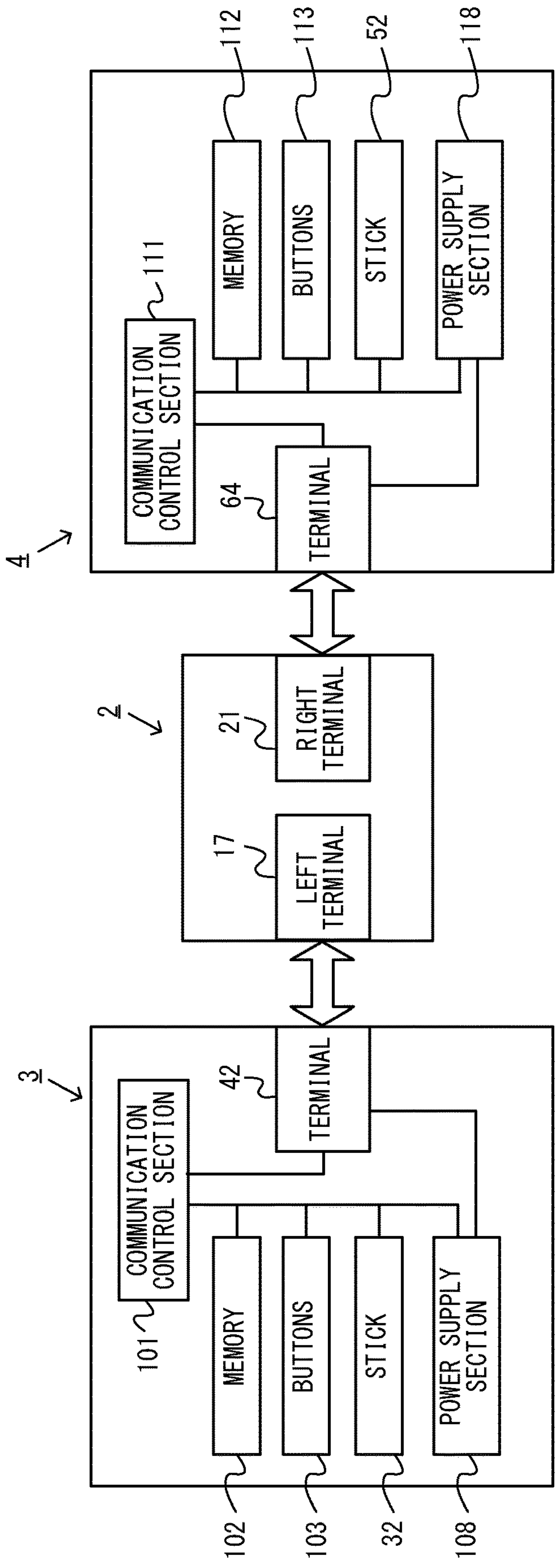
FIG. 7 is a block diagram showing an example of an internal configuration of a non-limiting main body apparatus, a non-limiting left controller and a non-limiting right controller.

FIG. 7 is a block diagram showing examples of the internal configurations of the main body apparatus 2, the left controller 3, and the right controller 4. It should be noted that the details of the internal configuration of the main body apparatus 2 are shown in FIG. 6 and therefore are omitted in FIG. 7.

The left controller 3 includes a communication control section 101, which communicates with the main body apparatus 2. As shown in FIG. 7, the communication control section 101 is connected to components including the terminal 42. In the exemplary embodiment, the communication control section 101 can communicate with the main body apparatus 2 through both wired communication via the terminal 42 and wireless communication not via the terminal 42. The communication control section 101 controls the method for communication performed by the left controller 3 with the main body apparatus 2. That is, when the left controller 3 is attached to the main body apparatus 2, the communication control section 101 communicates with the main body apparatus 2 via the terminal 42. Further, when the left controller 3 is detached from the main body apparatus 2, the communication control section 101 wirelessly communicates with the main body apparatus 2 (specifically, the controller communication section 83). The wireless communication between the communication control section 101 and the controller communication section 83 is performed in accordance with the Bluetooth (registered trademark) standard, for example.

Further, the left controller 3 includes a memory 102 such as a flash memory. The communication control section 101 includes, for example, a microcomputer (or a microprocessor) and executes firmware stored in the memory 102, thereby performing various processes.

The left controller 3 includes buttons 103 (specifically, the buttons 33 to 39, 43, 44, and 47). Further, the left controller 3 includes the analog stick ("stick" in FIG. 7) 32. Each of the buttons 103 and the analog stick 32 outputs information regarding an operation performed on itself to the communication control section 101 repeatedly at appropriate timing.

The communication control section 101 acquires information regarding an input (specifically, information regarding an operation or the detection result of the sensor) from each of input sections (specifically, the buttons 103, and, the analog stick 32). The communication control section 101 transmits operation data including the acquired information (or information obtained by performing predetermined processing on the acquired information) to the main body apparatus 2. It should be noted that the operation data is transmitted repeatedly, once every predetermined time. It should be noted that the interval at which the information regarding an input is transmitted from each of the input sections to the main body apparatus 2 may or may not be the same.

The above operation data is transmitted to the main body apparatus 2, whereby the main body apparatus 2 can obtain inputs provided to the left controller 3. That is, the main body apparatus 2 can determine operations on the buttons 103 and the analog stick 32 based on the operation data.

The left controller 3 includes a power supply section 108. In the exemplary embodiment, the power supply section 108 includes a battery and a power control circuit. Although not shown in FIG. 7, the power control circuit is connected to the battery and also connected to components of the left controller 3 (specifically, components that receive power supplied from the battery).

As shown in FIG. 7, the right controller 4 includes a communication control section 111, which communicates with the main body apparatus 2. Further, the right controller 4 includes a memory 112, which is connected to the communication control section 111. The communication control section 111 is connected to components including the terminal 64. The communication control section 111 and the memory 112 have functions similar to those of the communication control section 101 and the memory 102, respectively, of the left controller 3. Thus, the communication control section 111 can communicate with the main body apparatus 2 through both wired communication via the terminal 64 and wireless communication not via the terminal 64 (specifically, communication compliant with the Bluetooth (registered trademark) standard). The communication control section 111 controls the method for communication performed by the right controller 4 with the main body apparatus 2.

The right controller 4 includes input sections similar to the input sections of the left controller 3. Specifically, the right controller 4 includes buttons 113, and, the analog stick 52. These input sections have functions similar to those of the input sections of the left controller 3 and operate similarly to the input sections of the left controller 3.

The right controller 4 includes a power supply section 118. The power supply section 118 has a function similar to that of the power supply section 108 of the left controller 3 and operates similarly to the power supply section 108.

[2. Outline of Processing in Game System]

Hereinafter, an outline of information processing executed in the game system 1 will be described. In the exemplary embodiment, the game system 1 executes a game in which a plurality of characters including a player character operated by a player (or a user) appear in a virtual game space. In the game, a companion character that is a companion of the player character appears in addition to the player character. The player character defeats an enemy character in cooperation with the companion character to progress the game.

The companion character is a non-player character whose motion is automatically controlled by the game system 1. That is, the content of motion of the companion character is basically determined by the game system 1. In the exemplary embodiment, however, the player character can make an instruction to the companion character, and the companion character performs a predetermined skill motion according to the instruction by the player character. The skill motion is a motion using the skill of the companion character, and the specific content thereof is optional. For example, the skill motion may be a motion of attacking an enemy, or a motion of recovering or assisting an ally character (i.e., the player character or another companion character). In the exemplary embodiment, the skill motion to be performed according to the instruction by the player character is set for each companion character. In the exemplary embodiment, each companion character performs a skill motion unique to the companion character, according to the instruction by the player character. In the following description, a companion character that performs a motion of generating a wind as a skill motion.

[2-1. Skill Motion on the Ground]

Figure 8:
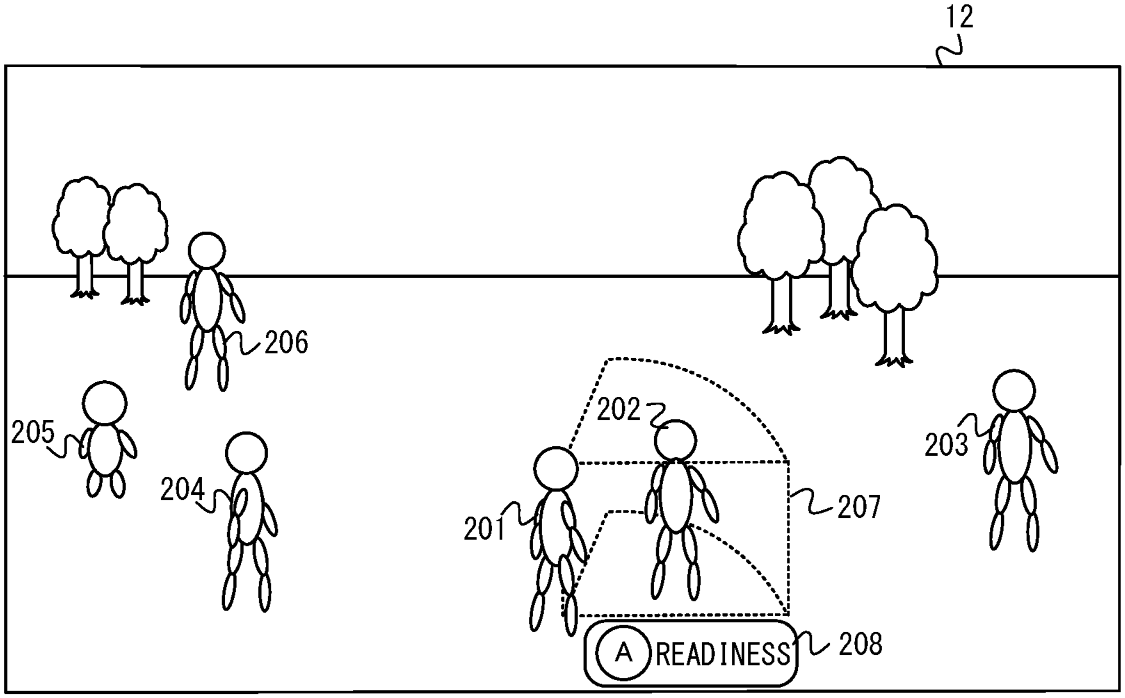
FIG. 8 shows an example of a game image when a player character causes a companion character to perform a skill motion.

Hereinafter, a process of causing a companion character to perform a skill motion when the player character is positioned on the ground will be described with reference to FIG. 8 to FIG. 10. FIG. 8 shows an example of a game image in which the player character causes a companion character to perform a skill motion. As shown in FIG. 8, during the game, the game system 1 displays, on the display 12, a game image representing a game space around a player character 201. In the example shown in FIG. 8, the player character 201 and a plurality of companion characters 202 to 206 including the companion character 202 capable of performing a skill motion of generating a wind, are arranged on the ground in the game space. In the exemplary embodiment, as shown in FIG. 8, the plurality of (five in FIG. 8) companion characters 202 to 206 appear in the game space. The number of companion characters appearing in the game space is not limited.

In the example shown in FIG. 8, the player character 201 approaches the companion character 202. In the case where the player character 201 is placed on the ground, the player character 201 can make a readiness instruction to a companion character by approaching the companion character. The readiness instruction instructs the companion character to enter a readiness state in which the companion character is ready to perform a skill motion. That is, the companion character becomes ready to execute the skill motion according to the readiness instruction having been performed.

In the exemplary embodiment, an action range 207 is set in an area within a predetermined distance from the player character 201 in a forward direction from the player character 201 (see FIG. 8). When the companion character is positioned within the action range 207 of the player character 201, the player character 201 can make a readiness instruction to the companion character. In the exemplary embodiment, the player character 201 can perform an action to an object (including a companion character) in the action range 207. This action is a motion according to the object. Examples of the action include a motion of making a readiness instruction to a companion character, and a motion of acquiring an item.

The action range 207 is set based on the position and orientation of the player character 201. In the exemplary embodiment, the action range 207 is a range within a predetermined distance from the player character 201 and having a predetermined angle to the right and left with respect to the forward direction of the player character 201 (see FIG. 8). The action range 207 may have any shape and size. The action range 207 is shown by dotted lines in FIG. 8, but may not necessarily be displayed.

Furthermore, as shown in FIG. 8, in the situation where the player character 201 can make a readiness instruction to the companion character 202, the game system 1 displays a readiness instruction image 208 indicating the readiness instruction together with the image of the game space. This notifies the player that he/she can make a readiness instruction. The readiness instruction image 208 is displayed at a predetermined position. For example, the readiness instruction image 208 may be displayed near the player character 201 or the companion character 202 so as to notify the player of the companion character to be subjected to the readiness instruction. In addition, the readiness instruction image 208 includes an image indicating an operation input for the readiness instruction (here, an input of pressing the A-button 53 of the right controller 4). This notifies the player of the operation input for the readiness instruction.

According to the readiness instruction (i.e., the operation input for the readiness instruction) having been made in the situation shown in FIG. 8, the game system 1 sets the companion character 202 subjected to the readiness instruction, in the readiness state. FIG. 9 shows an example of the game image in the situation where the companion character 202 is in the readiness state. Here, in the exemplary embodiment, as a skill motion, the companion character 202 generates a wind for a predetermined period in the forward direction of the player character 201 from behind the player character 201. Therefore, the game system 1 causes the companion character 202 in the readiness state to perform a motion of moving behind the player character 201 (see FIG. 9). In the readiness state, the companion character 202 moves according to movement of the player character 201 so as to be positioned behind the player character 201. When the companion character is in the readiness state, the game system 1 may display an effect image according to the skill motion, or may cause the companion character to perform a preparatory motion according to the skill motion, so that the user can recognize the content of the skill motion.

When the companion character is in the readiness state, the player character 201 can cause the companion character to perform the skill motion by making an execution instruction to the companion character. As shown in FIG. 9, in the situation where the companion character 202 is in the readiness state, the game system 1 displays an execution instruction image 209 indicating an execution instruction together with the image of the game space. This notifies the player that he/she can make the execution instruction. The execution instruction image 209 is displayed at a predetermined position. For example, the execution instruction image 209 is displayed near the player character 201 or the companion character 202 so as to notify the player of the companion character to be subjected to the execution instruction. In addition, the execution instruction image 209 includes an image indicating an operation input for the execution instruction (here, an input of pressing the A-button 53 of the right controller 4). This notifies the player of the operation input for the execution instruction.

Figure 9:
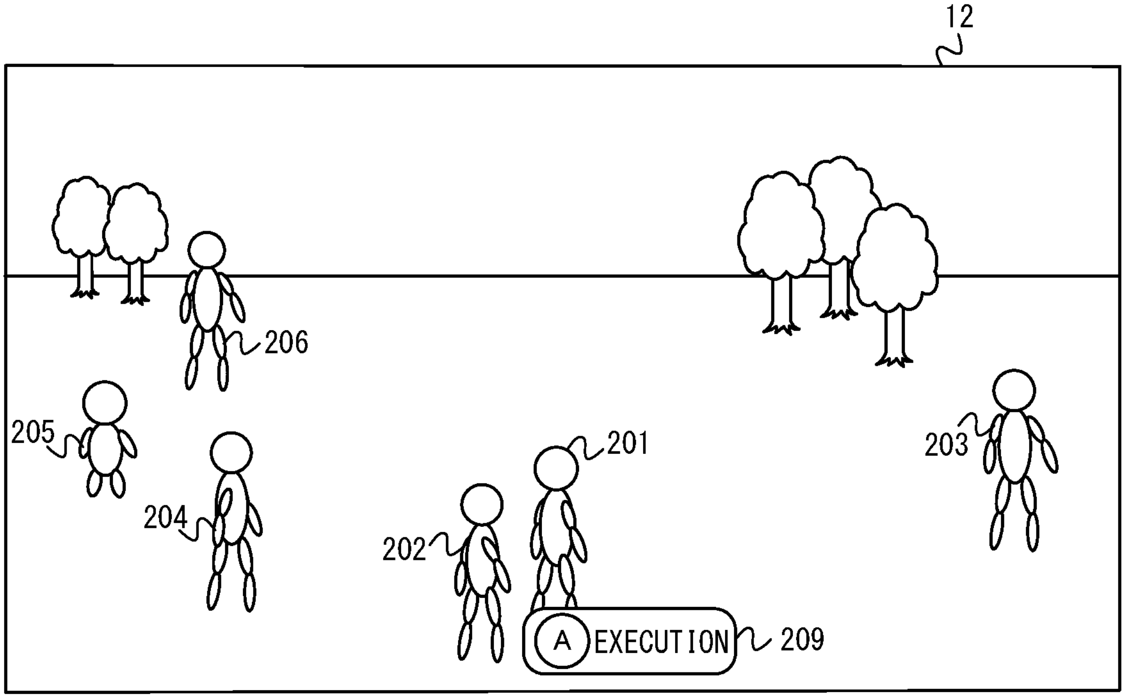
FIG. 9 shows an example of a game image in a situation where the companion character is in a readiness state.

According to the execution instruction (i.e., the operation input for the execution instruction) having been made in the situation shown in FIG. 9, the game system 1 causes the companion character 202 subjected to the execution instruction to perform the skill motion. FIG. 10 shows an example of the game image in the situation where the companion character 202 has performed the skill motion. In the example shown in FIG. 10, the companion character 202 performs the skill motion that generates a wind in the forward direction of the player character 201 according to the execution instruction. The player designates the direction of the wind by designating the orientation of the player character 201 through an operation of changing the orientation of the player character 201 (e.g., an operation to the analog stick 32 of the left controller 3), and generates the wind in the designated direction according to the execution instruction. By generating the wind, the companion character 202 can blow away an object placed in the game space with the wind, and can move the player character 201 that uses an item for gliding in the air (i.e., an item for falling described later) with the wind (i.e., the player character 201 moves in the air on the wind).

Figure 10:
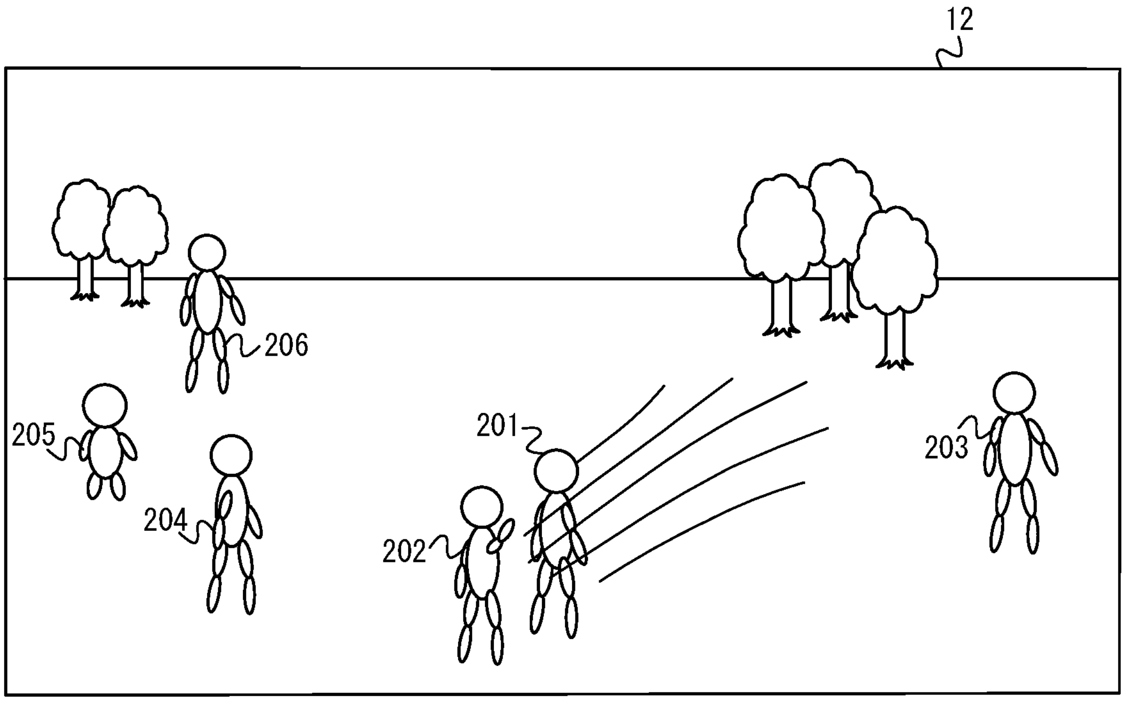
FIG. 10 shows an example of a game image in a situation where the companion character has performed a skill motion.

In the example shown in FIG. 10, the direction in which the companion character performs the skill motion is designated by the player. Here, as for the skill motion that to be performed by the companion character, the player may be able to designate a target position due to the skill motion. For example, the skill motion may be a motion of generating a wind at a target position designated by the player in the game space. The skill motion to be performed by each companion character may have any content, and may be a motion whose direction or position need not be designated.

In the example shown in FIG. 10, the operation input for making the execution instruction is the same as the operation input for making the readiness instruction, i.e., pressing the A-button 53 of the right controller 4. This allows the player to perform the readiness instruction and the execution instruction by the easy-to-understand operation, thereby improving the operability of the operation for causing the companion character to perform the skill motion. In other embodiments, the operation input for making the execution instruction may be different from the operation input for making the readiness instruction.

As described above, according to the exemplary embodiment, the player character firstly makes the readiness instruction to the companion character, and then makes the execution instruction to the companion character that has entered the readiness state according to the readiness instruction, thereby causing the companion character to perform the skill motion. That is, when the operation input has been performed by the user in the state where a predetermined positional relationship indicating that the player character and the companion character are near to each other (specifically, the companion character is positioned in the action range) is satisfied, the game system 1 shifts the companion character to the readiness state for the control corresponding to the companion character (specifically, the control for causing the companion character to perform the skill motion). Then, when the companion character is in the readiness state, the game system 1 performs the above control toward a direction or a position designated by the user, according to an operation input, including designation of the direction or the position (specifically, an input for changing the orientation of the player character, and an input for making the execution instruction), having been performed. Here, since the player character needs to approach the companion character in order to achieve the predetermined positional relationship, the player character may move in the direction toward the companion character. At this time, if the skill motion is immediately executed in response to the operation input, the skill motion may be executed in the direction from the player character toward the companion character, and the direction in which the skill motion is executed may be different from the direction intended by the player. In this regard, according to the above example, the player makes the readiness instruction and then makes the execution instruction with the direction or the position being designated. Therefore, for example, it is possible to reduce the possibility of an erroneous operation such as the skill motion being performed toward a direction or a position not intended by the player, or a skill motion being performed even through the player does not intend to cause the skill motion. Thus, the operability of the game can be improved.

The "operation input including designation of the direction or the position by the user" may be an input of designating the direction or the position. For example, at a timing when a predetermined time has elapsed from when the companion character was set in the readiness state according to the readiness instruction, the game system 1 may cause the companion character to perform the skill motion toward the direction (i.e., the orientation of the player character) designated at the time point. Moreover, the "operation input including designation of the direction or the position by the user" may be performed by an input for designating the direction or the position, and an input for canceling the input of making the readiness instruction. For example, after setting the companion character in the readiness state according to the input of pressing the A-button 53 (at this time, the A-button 53 is being pressed down), the game system 1, while receiving the input for designating the direction, may cause the companion character to perform the skill motion, in response to cancellation of pressing of the A-button 53, toward the direction designated at the time of the cancellation.

In other embodiments, the game system 1 may receive the execution instruction without receiving the readiness instruction. That is, the game system 1 may receive the execution instruction in the state where the companion character is positioned in the action range of the player character, and may cause the companion character to perform the skill motion when the execution instruction has been made by the player.

In the exemplary embodiment, after a companion character has performed a skill motion, the companion character cannot execute a skill motion again until a predetermined standby time elapses from the previous skill motion. That is, on the condition that the standby time has elapsed from execution of control for the skill motion corresponding to the companion character, the game system 1 allows the control to be executed again. This inhibits the player from causing the companion character to frequently perform the skill motion, thereby inhibiting the game from becoming too advantageous to the player.

Figure 11:
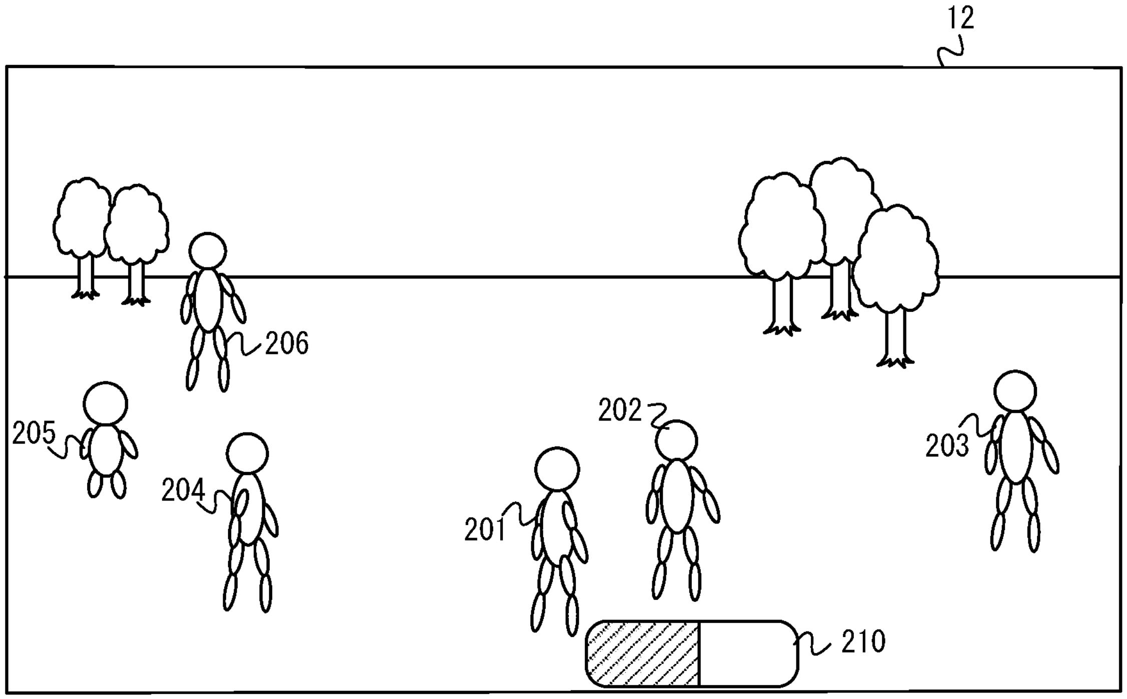
FIG. 11 shows an example of a game image in a case where the player character approaches the companion character before a standby time elapses.

FIG. 11 shows an example of a game image in a case where the player character approaches a companion character before the standby time elapses. If the companion character 202 enters the action range (not shown FIG. 11) of the player character 201 before the standby time elapses after a skill motion has been performed, the game system 1 displays a remaining time image 210 instead of the readiness instruction image 208, as shown in FIG. 11. The remaining time image 210 is an image indicating a remaining time until the lapse of the standby time regarding the companion character. For example, the remaining time image 210 is an image indicating a gauge whose length changes according to the length of the remaining time. The remaining time image 210 notifies the player that a readiness instruction is not receivable, and the remaining time until a readiness instruction becomes receivable. If the remaining time indicated by the remaining time image 210 becomes 0 (i.e., if a readiness instruction becomes receivable) while the remaining time image 210 is being displayed, the readiness instruction image 208 is displayed instead of the remaining time image 210. The remaining time image 210 may be displayed in addition to the readiness instruction image 208. In other embodiments, the game system 1 may receive the readiness instruction and set the companion character to the readiness state even before the standby time elapses after the skill motion, while not receiving the execution instruction until the standby time elapses.

In other embodiments, after a companion character has performed a skill motion, the game system 1 may cause this companion character to perform a skill motion again without waiting until the standby time elapses. Moreover, in other embodiments, the game system 1 may set a standby time for an execution instruction by the player character to any companion character, instead of setting a standby time for a skill motion of each companion character. That is, on the condition that the standby time has elapsed from when the player character made the execution instruction to any companion character, the game system 1 may permit the execution instruction by the player character to each companion character.

In the exemplary embodiment, when the player character 201 is placed on the ground, the game system 1 controls the companion characters 202 to 206 to move according to movement of the player character 201. Specifically, the game system 1 performs a control for moving the companion characters 202 to 206 so as to accompany the player character 201 according to movement of the player character 201. In addition, the game system 1 performs a control for stopping movements of the companion characters 202 to 206 within a predetermined range including the player character 201, according to stop of movement of the player character 201. Thus, the companion characters 202 to 206 are controlled in movement so as to be positioned around the player character 201. This makes the player character 201 more likely to approach the companion characters 202 to 206, and therefore allows the player character 201 to easily make the instruction regarding the skill motion. The specific method of movement control for the companion characters 202 to 206 in the case where the player character 201 is positioned on the ground is optional. For example, in other embodiments, the game system 1 may control movement of a companion character independently of movement and position of the player character.

As described above, in the exemplary embodiment, the plurality of companion characters appear in the case where the player character is positioned on the ground. The player character approaches one companion character among the plurality of companion characters and makes an instruction to this companion character, thereby selectively causing the companion character to perform a skill motion.

[2-2. Skill Motion in the Air]

Next, a process of causing a companion character to perform a skill motion when the player character is positioned in the air will be described. In the exemplary embodiment, the player character may be positioned in the air as it falls from a high place, for example. Even in the case where the player character is in the air, as in the case where it is on the ground, the player character can make instructions (i.e., the readiness instruction and the execution instruction) for causing the skill motion of generating a wind, to the companion character that performs the skill motion.

The state where the player character is positioned in the air is, for example, the state where the player character is not in contact with a ground (the ground itself may be floating in the air) or a wall surface in the game space. However, when the player character is not in contact with the ground for a short time because it jumps, the game system 1 may determine that this state is not the state where the player character is positioned in the air, but the state where player character is positioned on the ground. For example, when the state where the player character is not in contact with the ground or the wall continues for a predetermined time or more, the game system 1 may determine that the player character is positioned in the air. Moreover, for example, when the player character is away from the ground or the wall by a predetermined distance or more, the game system 1 may determine that the player character is positioned in the air.

The player character may ride on a flying vehicle. The game system 1 may treat the state where the player character rides on such a vehicle, similarly to the state where the player character is positioned on the ground. That is, in the state where the player character rides on the vehicle, the game system 1 may execute a process of causing a companion character, which is designated by the player from among a plurality of companion characters, to perform a skill motion, as in the case where the player character is positioned on the ground. In other embodiments, the state where the player character rides on the vehicle may be treated as a state different from the state where it is positioned on the ground and the state where it is positioned in the air.

Figure 12:
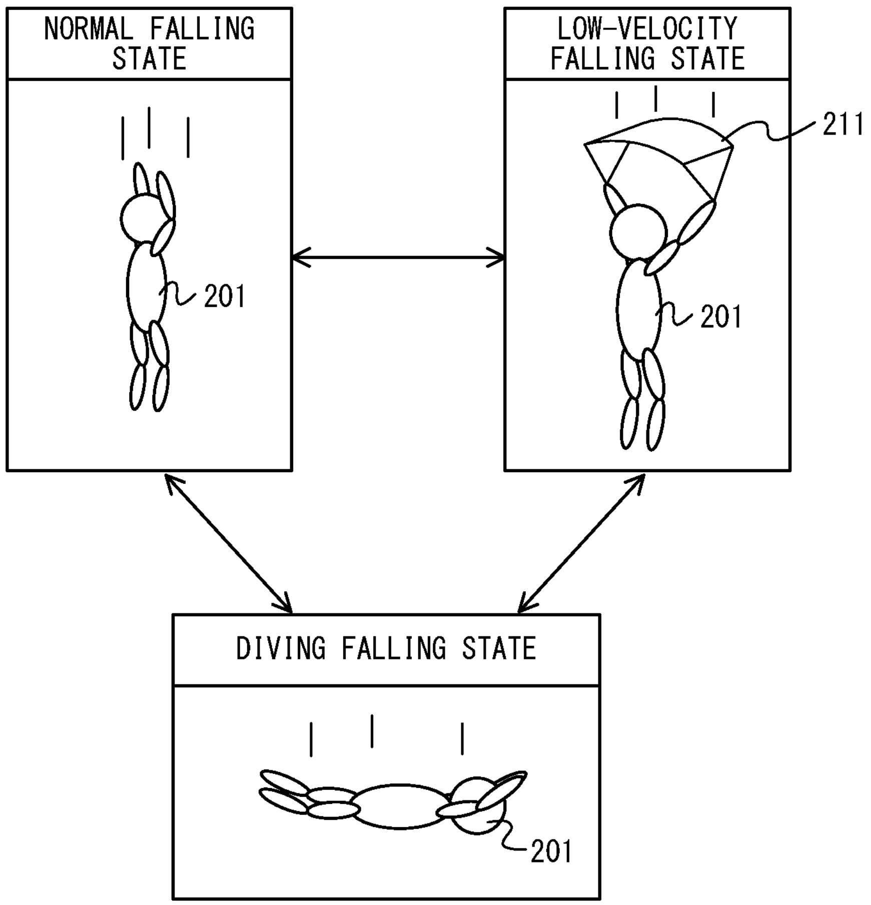
FIG. 12 shows an example of a state that the player character can take in the air.

FIG. 12 shows an example of the state that the player character can take in the air. In the exemplary embodiment, the player character basically cannot float in the air, and falls due to the effect of virtual gravity when it is in the air. The player character, in the air, can take three states including a normal falling state, a low-velocity falling state, and a diving falling state (see FIG. 12). In other embodiments, the states that the player character can take in the air may include a state other than the above three states, and may not include any of the three states. In other embodiments, the player character may hover or go up in the air against the virtual gravity.

The normal falling state is a state where the player character 201 falls with its head being directed upward in the game space. In the exemplary embodiment, the player character 201 firstly enters the normal falling state after it jumps from a high place without performing a diving motion described later. In the normal falling state, the player cannot perform an operation of moving the player character 201 in the horizontal direction. That is, in the normal falling state, the player character 201 falls downward according to the laws of physics (e.g., the law of motion and the law of gravity) adopted in the game.

The low-velocity falling state is a state where the player character 201 falls in a posture of using a fall item 211 which imitates a parachute (see FIG. 12). In the exemplary embodiment, when the player character is in the normal falling state or the diving falling state, the player character 201 transitions to the low-velocity falling state, according to an operation input for using the fall item 211 (e.g., an input of pressing the X-button 55 of the right controller 4) having been performed by the player. In the low-velocity falling state, the player character 201 falls at a falling velocity lower than that in the normal falling state. In the exemplary embodiment, in the low-velocity falling state, the player character 201 falls while moving in the horizontal direction in the game space, according to a movement instruction by the player (e.g., an input instruction by tilting the analog stick 32 of the left controller 3). Specifically, in the low-velocity falling state, the player character 201 falls as if turning to the left and right (e.g., as if curving to the left and right while traveling forward). When there is no movement instruction by the player, the player character 201 falls vertically downward in the game space. However, in other embodiments, the player character 201 may be controlled to fall while moving forward. From the above, it can be said that the low-velocity falling state is a state where the player character 201 can move by a larger amount with respect to the horizontal direction in the game space as compared to the normal falling state. In other embodiments, even in the normal falling state, the player character 201 may be movable in the horizontal direction according to a movement instruction by the player. In this case, the amount of movement in the horizontal direction during the normal falling (specifically, the amount of movement in the horizontal direction with the falling distance being a predetermined unit distance) is set to be smaller than the amount of movement in the horizontal direction during the low-velocity falling. That is, the player can move the player character 201 by a larger amount with respect to the horizontal direction during the low-velocity falling than during the normal falling.

When the player character 201 is in the low-velocity falling state, if use of the fall item 211 is ended according to a predetermined condition (e.g., an instruction made by the player, or the player character 201 running out of stamina), the player character 201 transitions to the normal falling state.

The diving falling state is a state in which the player character 201 falls with the forward direction thereof being directed downward in the game space. In the exemplary embodiment, when the player character 201 is in the normal falling state or the low-velocity falling state, if a predetermined operation input for transition to the diving falling state (e.g., an input of pressing the first R button 60 of the right controller 4) is performed, the player character 201 enters the diving falling state. If the player character 201 falls from a high place while performing a diving motion (e.g., a motion of jumping off a high place), the player character 201 firstly enters the diving falling state. In the diving falling state, the player character 201 falls at a falling velocity that is lower than that in the normal falling state and higher than that in the low-velocity falling state. During the diving falling, the player character 201 falls while moving forward, backward, leftward, and rightward in the game space (i.e., in the horizontal direction in the game space) with reference to the player character 201 facing downward in the game space, according to up, down, left, and right movement instructions by the player (e.g., input instructions by tilting the analog stick 32 of the left controller 3). In the exemplary embodiment, the amount of movement in the horizontal direction during the diving falling (specifically, the amount of movement in the horizontal direction with the falling distance being a predetermined unit distance) is smaller than the amount of movement in the horizontal direction during the low-velocity falling. That is, the player can cause the player character 201 to move by a larger amount with respect to the horizontal direction during the low-velocity falling than during the diving falling. When the player character 201 is in the diving falling state, the player character 201 transitions to the normal falling state according to a predetermined condition (e.g., an instruction made by the player) having been satisfied.

The game system 1 may set a condition for the player character 201 to enter the low-velocity falling state and the diving falling state. For example, the player character 201 may enter the low-velocity falling state or the diving falling state, on the condition that the player character 201 is away from the ground by a predetermined distance or more, or a predetermined time or more elapses from when the player character 201 is positioned in the air, for example. Such a condition prevents transition of the player character 201 to the low-velocity falling state or the diving falling state when the player character 201 just jumps on the ground.

Figure 13:
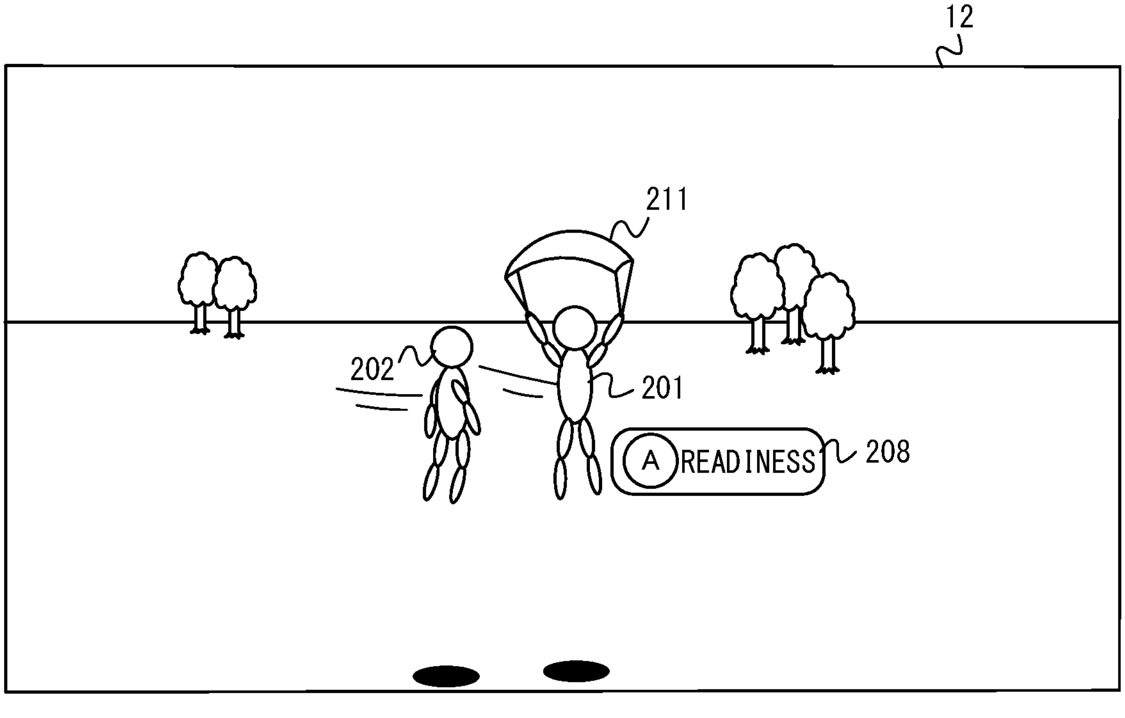
FIG. 13 shows an example of a game image in a case where the player character is in a low-velocity falling state.

FIG. 13 shows an example of a game image in the case where the player character 201 is in the low-velocity falling state. As shown in FIG. 13, by using the fall item 211 during falling, the player character 201 can slowly fall while moving in the horizontal direction. Thus, the player character 201 can land on a place distant from the place where it starts falling.

In the exemplary embodiment, when the player character 201 is positioned in the air, if the player character 201 is in the low-velocity falling state or the diving falling state, the player character 201 can make an instruction for a skill motion to the companion character 202. The player character 201 may be able to make an instruction to the companion character 202 when it is in at least any of the states that the player character 201 can take in the air. For example, in other embodiments, the player character 201 may be able to make an instruction to the companion character 202 when it is positioned in the air. For example, in other embodiments, the player character 201 may be able to make an instruction to the companion character 202 even when it is in the normal falling state. Moreover, for example, the player character 201 may not able to make an instruction to the companion character 202 when it is in the diving falling state.

In the exemplary embodiment, when the player character 201 is in the low-velocity falling state or the diving falling state, the player character 201 can make an instruction to the companion character 202 regardless of the position of the companion character 202 (in other words, regardless of the positional relationship between the player character 201 and the companion character 202). That is, in the above case, the player can always cause the player character 201 to make the above instruction, without operating the player character 201 so as to approach and face the companion character 202. When the player character 201 is in the low-velocity falling state or the diving falling state, the readiness instruction image 208 is displayed regardless of the position of the companion character 202 (see FIG. 13).

In the exemplary embodiment, although the player can perform an operation to move the player character 201 in the game space when the player character 201 is in the low-velocity falling state or the diving falling state, it may be difficult for the player to perform an operation of moving the player character 201 to the position of a desired companion character, as compared to the case where the player character 201 is positioned on the ground. In this regard, in the exemplary embodiment, when the player character 201 is in the low-velocity falling state or the diving falling state, the player character 201 can make an instruction regardless of the position of the companion character 202. That is, in the exemplary embodiment, the instruction to the companion character can be easily performed in the situation where it is difficult to perform the movement operation because the player character 201 is positioned in the air, whereby the operability for making the instruction can be improved.

In the exemplary embodiment, when the player character 201 is positioned in the air, the player character 201 cannot make an instruction for a skill motion to the companion characters 203 to 206 other than the companion character 202. That is, when the player character 201 is in the low-velocity falling state or the diving falling state, the game system 1 allows only the companion character 202 to execute a skill motion, and does not allow the other companion characters 203 to 206 to execute a skill motion. That is, as for the other companion characters 203 to 206, the game system 1 does not receive an operation input by the player for causing any of these characters to make a readiness instruction and an execution instruction.

From the above, in the exemplary embodiment, in the case where the player character is positioned on the ground, according to a predetermined operation input (i.e., an operation input for a readiness instruction and an execution instruction) having been performed in the state where a predetermined positional relationship indicating that the player character is near one companion character among a plurality of companion characters (i.e., the state where the companion character is positioned in the action range) is satisfied, the game system 1 executes a control associated with the companion character (i.e., a control for execution of a skill motion). Meanwhile, in the case where the player character is positioned in the air, even when the above predetermined operation input has been performed, the game system 1 does not execute the control associated with the another companion character (i.e., any of the companion characters 203 to 206) different from a predetermined companion character (i.e., the companion character 202). Therefore, in the exemplary embodiment, when the player character is positioned on the ground, the player is allowed to selectively execute a control regarding any of the plurality of companion characters. Meanwhile, when the player character is in the air where the movement thereof is limited, the operation for the control is facilitated. In other embodiments, even when the player character is positioned in the air, the game system 1 may execute the control associated with the other companion characters in response to an operation input by the player.

In the exemplary embodiment, the companion character 202 continues to appear in the game space even when the player character 201 is positioned in the air (see FIG. 13). In this case, the game system 1 also performs a control for moving the companion character 202 according to movement of the player character 201 as in the case where the player character 201 is on the ground. In the exemplary embodiment, the companion character 202 is controlled to move accompanying the player character 201 even when the player character 201 is positioned in the air, as in the case where it is on the ground. The specific method for the movement control regarding the companion character 202 is optional. The specific control method in the case where the player character 201 is positioned in the air may be the same as or different from that in the case where it is positioned on the ground.

Meanwhile, when the player character 201 is positioned in the air, the companion characters 203 to 206 other than the companion character 202 withdraw from the game space. Therefore, in the above case, only the companion character 202 among the plurality of companion characters 202 to 206 appears in the game space while the other companion characters 203 to 206 do not appear in the game space (see FIG. 13). In the setting of the game, the companion character 202 can fly in the air, whereas the other companion characters 203 to 206 cannot fly in the air.

As described above, in the exemplary embodiment, when the player character is positioned in the air, the game system 1 causes the companion character 202 to move according to the position of the player character 201, and does not cause the companion characters 203 to 206 other than the companion character 202 among the plurality of companion characters to move according to the position of the player character 201. Thus, the companion character 202 capable of executing a skill motion is more likely to be placed around the player character 201, while the companion characters 203 to 206 incapable of executing a skill motion are less likely to be placed (or are not placed) around the player character 201. This allows the player to easily know which companion character is a companion character capable of executing a skill motion in the air. In addition, rationality can be given to the fact that the companion characters 203 to 206 being incapable of executing a skill motion in the air, thereby reducing the possibility that the player feels discomfort.

In the exemplary embodiment, the other companion characters 203 to 206 are caused to withdraw from the game space, thereby preventing them from moving according to the position of the player character 201. At this time, the game system 1 may cause objects or effects representing the other companion characters (e.g., spheres of light representing the companion characters) to appear around the player character, instead of the other companion characters. Thus, the player is notified, in an easy-to-understand manner, that the companion characters have withdrawn from the game space. In other embodiments, the game system 1 may not perform movement control according to the position of the player character 201 while causing the other companion characters 203 to 206 to appear in the game space. For example, when the player character is positioned in the air, the other companion characters may be controlled to stay on the ground and not to move according to movement of the player character in the air.

In other embodiments, the other companion characters 203 to 206 may also be controlled according to the position of the player character 201, like the companion character 202.

As described above, in the exemplary embodiment, after the companion character 202 has performed a skill motion, the companion character 202 cannot execute a skill motion again until a predetermined standby time elapses from the previous skill motion. Here, in the exemplary embodiment, a remaining time until the lapse of the standby time is set regardless of whether the player character 201 is positioned on the ground or in the air. That is, on the condition that the standby time has elapsed from execution of control for the skill motion on the ground or execution of control for the skill motion in the air, the game system 1 allows execution of control for a new skill motion on the ground or in the air. Thus, in both cases where the player character 201 is on the ground and in the air, it is possible to inhibit the player from taking excessive advantage by causing the companion character 202 to frequently perform the skill motion.

In the exemplary embodiment, an operation part to be used for an input for causing the companion character 202 to perform a skill motion in the case where the player character 201 is positioned in the air, is the same as that in the case where it is positioned on the ground (specifically, the operation part is the A-button 53 of the right controller 4). That is, in the exemplary embodiment, the player can perform, using the same operation part, (a) an operation of instructing execution of a skill motion after designating a companion character to be caused to perform the skill motion in the case where the player character 201 is positioned on the ground, and (b) an operation of instructing a companion character to execute a skill motion, with the companion character to be caused to perform the skill motion being fixed, in the case where the player character 201 is positioned in the air. Thus, the input method for causing the skill motion can be made easy to understand for the player, thereby reducing the possibility of erroneous input by the player.

In the exemplary embodiment, the input method for causing the companion character 202 to perform a skill motion in the case where the player character 201 is positioned in the air is the same as that in the case where the player character 201 is positioned on the ground. That is, in either case, the input for causing the companion character 202 to perform a skill motion is an input including two times of inputs to a predetermined operation part (specifically, the A-button 53 of the right controller 4) (further including an input of designating a direction in the exemplary embodiment). Specifically, in both cases where the player character 201 is in the air and on the ground, the player causes the player character 201 to perform a readiness instruction by the first input to the operation part, and causes the player character 201 to perform an execution instruction by the second input to the operation part, thereby causing the companion character 202 to perform a skill motion. Therefore, according to the exemplary embodiment, since the input method for causing a skill motion is the same in both the cases where the player character 201 is positioned in the air and where it is positioned on the ground, the player can easily understand the input method, thereby further reducing the possibility of erroneous input by the player. Moreover, in either case, since the skill motion is executed by the second input, the skill motion is prevented from being executed against the player's intention due to one erroneous input by the player to the operation part.

In the exemplary embodiment, when the player character 201 is positioned in the air, only the companion character 202 can be caused to perform a skill motion. Therefore, in contrast to the case where the player character 201 is positioned on the ground, it is not necessary to bring the player character 201 near to the companion character caused to perform a skill motion. Therefore, when the player character 201 is positioned in the air, even if the skill motion is executed according to the first input to the operation part, the problem that the direction in which the skill motion is executed is different from the direction intended by the player, does not occur. Therefore, when the player character 201 is positioned in the air, it is also conceivable to cause a skill motion according to the first input to the operation part. In the exemplary embodiment, however, in order to make the input method for causing a companion character to perform a skill motion easy to understand for the player, the player is caused to perform two inputs even when the player character 201 is positioned in the air, as in the case where it is positioned on the ground.

In other embodiments, the input method for causing the companion character 202 to perform a skill motion may differ between when the player character 201 is positioned in the air and when it is positioned on the ground. For example, when the player character 201 is in the low-velocity falling state or the diving falling state, the game system 1 may cause the companion character 202 to perform a skill motion by one input to the operation part by the player. Specifically, in the above case, the game system 1 may receive an input for performing the execution instruction, with the companion character 202 being constantly in the readiness state. This allows the player to cause the companion character 202 to more quickly perform a skill motion. In other embodiments, when the player character 201 is positioned in the air, the game system 1 may cause the companion character 202 to perform a skill motion according to an input to an operation part different from that in the case where the player character 201 is positioned on the ground.

Figure 14:
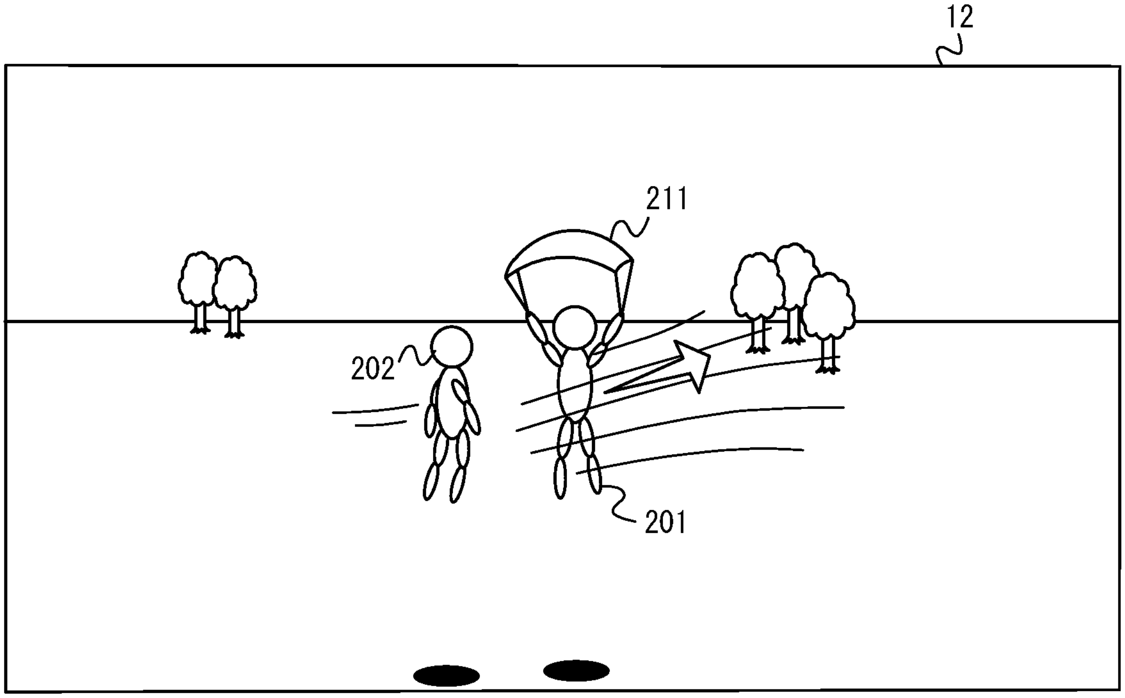
FIG. 14 shows an example of a game image in a situation where the companion character performs a skill motion in the air.

FIG. 14 shows an example of a game image in the situation where the companion character 202 performs a skill motion in the air. As shown in FIG. 14, in the exemplary embodiment, the skill motion that the companion character 202 performs in the air is a motion of generating a wind in the game space, like the skill motion on the ground. That is, in both cases where the player character is on the ground and in the air, the skill motion that the companion character 202 performs is a motion of generating a force for moving an object (including the player character 201) in the game space. Thus, the skill motion is caused to provide the same kind of effect in both cases where the player character is on the ground and in the air, whereby the effect of the skill motion has consistency. This allows the player to easily understand the effect of the skill motion, and cause the companion character 202 to perform the skill motion without a sense of discomfort.

In the exemplary embodiment, both the skill motion on the ground and the skill motion in the air generate a force for moving the object. In this regard, it can be said that both the skill motions provide the same kind of effect on the game. However, the skill motion on the ground and the skill motion in the air may not necessarily provide the exactly same effect, and may provide different effects. For example, the skill motion on the ground and the skill motion in the air may be different from each other in the strength of the wind, the range where the wind is generated, and the period in which the wind is generated. In other embodiments, the skill motion on the ground and the skill motion in the air may provide different kinds of effects. For example, the skill motion on the ground may provide an effect of attacking an enemy character while the skill motion in the air may provide an effect of generating a force for moving the player character.

When the player character is in the low-velocity falling state in the air, the game system 1 controls movement of the player character 201 so as to move under the influence of control for the skill motion. That is, when the player character 201 in the low-velocity falling state receives the wind generated by the skill motion of the companion character 202, the game system 1 moves the player character 201 in the direction of the wind (in other words, accelerates the movement in the direction of the wind; see an arrow in FIG. 14). Therefore, by causing the companion character 202 to perform the skill motion in the air, the player can cause the player character 201, falling while gliding by using the fall item 211, to move a longer distance. From the above, in the exemplary embodiment, movement of the player character 201 in the low-velocity falling state can be assisted by the skill motion, whereby the player can effectively use the skill motion even in the air.

In the exemplary embodiment, it can be said that control for the skill motion of the companion character 202 in the air is a control having an influence on movement of the player character in the air. As described above, in the exemplary embodiment, the player need not move the player character 201 in order to cause the companion character 202 to perform a skill motion in the air. Therefore, in the exemplary embodiment, the player need not perform an operation of firstly moving the player character 201 itself in order to move the player character 201 (i.e., in order to cause the skill motion), and the player can easily perform the operation of moving the player character in the air. Furthermore, in the exemplary embodiment, the player can move the player character also by the skill motion in addition to the movement control for the player character, whereby the method of moving the player character 201 in the air can be varied.

In the exemplary embodiment, even in the case where the player character 201 is in the diving falling state in addition to the case where it is in the low-velocity falling state, the player character 201 can cause the companion character 202 to perform the skill motion. The game system 1 may move the player character 201 in the diving falling state with or without being influenced by the wind.

In the exemplary embodiment, the game system 1 differentiates the setting of the player character 201 regarding the influence of the wind due to the skill motion, between the case where the player character 201 is positioned on the ground and the case where the player character 201 is in the low-velocity falling state. Specifically, when the player character 201 is positioned on the ground, the game system 1 sets the player character 201 so as not to be influenced by the wind (i.e., so as not to be moved by the wind). Meanwhile, when the player character 201 is in the low-velocity falling state, the game system 1 sets the player character 201 so as to be influenced by the wind (i.e., so as to be moved by the wind). Thus, the game system 1 can move the player character 201 under the influence of the wind when the player character 201 is in the low-velocity falling state, and can prevent the player character 201 from moving under the influence of the wind when the player character 201 is on the ground. The specific method for preventing the player character 201 on the ground from moving under the influence of the wind is optional. For example, in other embodiments, the game system 1 may perform the process of moving the player character 201 with the wind while considering a friction between the player character 201 and the ground to prevent the player character 201 on the ground from moving under the influence of the wind. When the player character 201 is in the normal falling state or the diving falling state, the player character 201 may or may not be set to be influenced by the wind.

As described above, the game system 1 does not move the player character according to the movement force due to control for the skill motion of the companion character 202 when the player character is positioned on the ground, and moves the player character according to the movement force due to control for the skill motion when the player character is positioned in the air. Thus, the player is allowed to operate the movement of the player character in the air according to the above control, and the possibility that the player character moves on the ground against the player's intention can be reduced.

In the exemplary embodiment, the influence of the wind due to the skill motion on the player character 201 differs between the case where the player character 201 is on the ground and the case where it is in the air, but the influence on the other objects is the same in both the cases. For example, among the objects arranged in the game space, an object set to be influenced by the wind is controlled to be blown away by the wind regardless of whether the wind is generated when the player character 201 is positioned on the ground or in the air.

Figure 15:
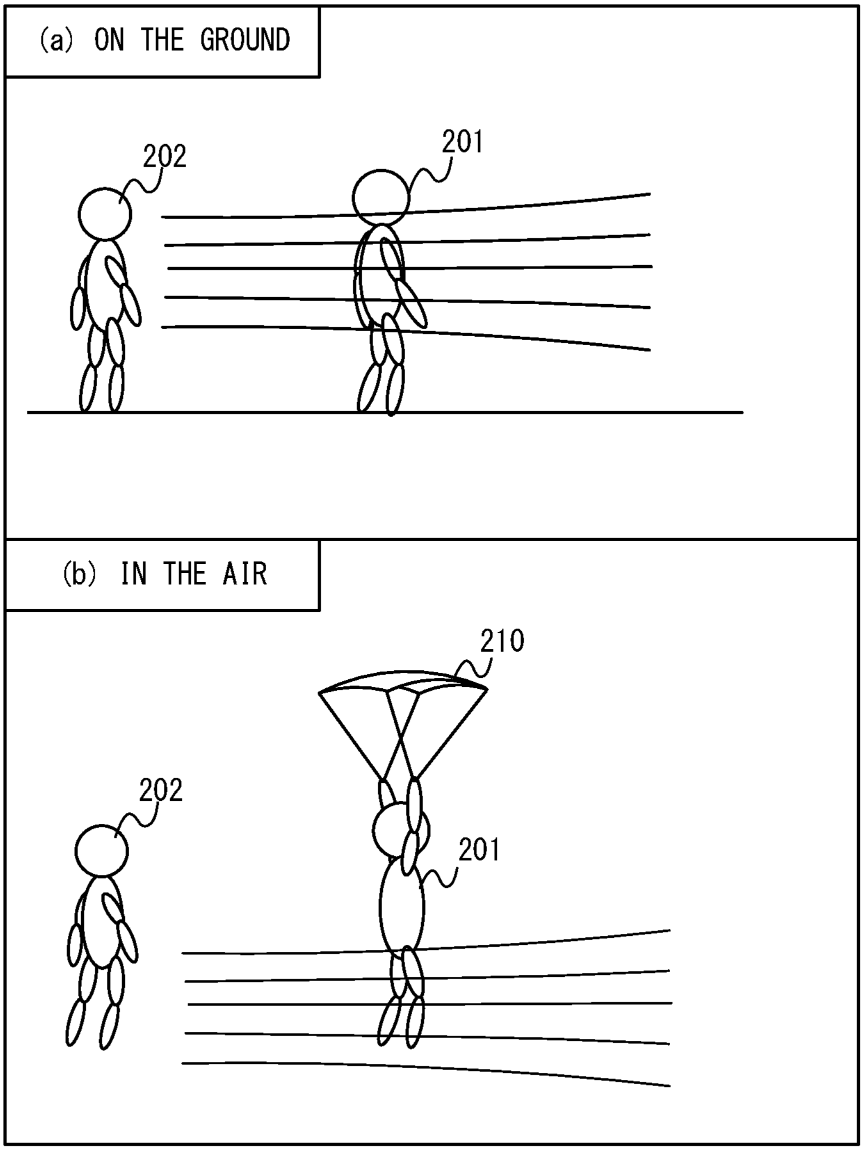
FIG. 15 shows examples of a wind generated on the ground and a wind generated in the air.

In the exemplary embodiment, the wind due to the skill motion of the companion character 202 is generated at different positions depending on whether the wind is generated when the player character 201 is positioned on the ground or in the air. FIG. 15 shows examples of a wind generated on the ground and a wind generated in the air. In the exemplary embodiment, in both the cases where the player character 201 is positioned on the ground and where it is positioned in the air, the companion character 202 positioned behind the player character 201 generates the wind in the forward direction of the player character 201.

When the player character 201 is positioned on the ground, the companion character 202 generates a wind within a predetermined vertical range including the position at the center, in the vertical direction, of the player character 201 (i.e., the center between the crown of the head and the soles of the feet) (see (a) of FIG. 15). Meanwhile, when the player character 201 is positioned in the air, the companion character 202 generates a wind in a position lower than the position in the case where the player character 201 is on the ground, with reference to the center, in the vertical direction, of the player character 201 at that time point (see (b) of FIG. 15). For example, the predetermined vertical range in which the wind is generated may be positioned lower than the center, in the vertical direction, of the player character 201. The reason is as follows. When the player character 201 is positioned in the air, the player character 201 is falling (while moving in the horizontal direction) even after the wind is generated. Therefore, the predetermined vertical range set as described above allows the player character 201 to receive the wind even after it slightly falls from the generation of the wind.

As described above, in the exemplary embodiment, the game system 1 executes, as a control for the skill motion in the case where the player character 201 is positioned on the ground, a control for generating a movement force at a predetermined height with reference to the player character 201, and executes, as a control for the skill motion in the case where the player character 201 is positioned in the air, a control for generating a movement force at a height lower than the above predetermined height with reference to the player character 201. Thus, the movement force can be effectively given to the player character 201 falling in the air.

The game system 1 may cause each of the companion characters 202 to 206 to appear in the game space and withdraw from the game space, according to an instruction made by the player during the game. For example, the game system 1 may receive an operation input designating a companion character to be caused to appear or withdraw, on a menu screen displayed according to a predetermined operation input made by the player during the game, and may cause the designated companion character to appear or withdraw. If the player character 201 enters the state of being positioned in the air while the companion character 202 is withdrawn from the game space according to the instruction of the player, the game system 1 maintains the state where the companion character 202 is withdrawn. Therefore, in the above case, the companion characters 202 to 206 do not appear in the game space.

[3. Specific Example of Processing in Game System]

A specific example of information processing in the game system 1 will be described with reference to FIG. 16 to FIG. 19.

Figure 16:
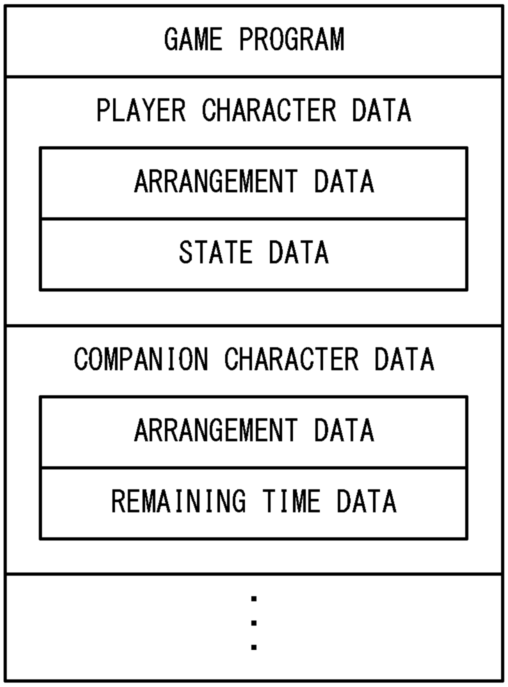
FIG. 16 shows an example of various data used for information processing in a non-limiting game system.

FIG. 16 shows an example of various data used for the information processing in the game system 1. The various data shown in FIG. 16 are stored in a storage medium (e.g., the flash memory 84, the DRAM 85, and/or the memory card attached to the slot 23) accessible by the main body apparatus 2.

As shown in FIG. 16, the game system 1 has a game program stored therein. The game program is a game program for executing game processing (specifically, processes shown in FIG. 17 to FIG. 19) in the exemplary embodiment. The game system 1 has, stored therein, player character data and companion character data.

The player character data is data regarding the player character. In the exemplary embodiment, the player character data includes arrangement data and state data. The arrangement data indicates the position and orientation of the player character in the game space. The state data indicates the state of the player character on the ground or in the air. In the exemplary embodiment, the state data indicates any of the on-ground state, the normal falling state, the low-velocity falling state, and the diving falling state of the player character The companion character data is data regarding a companion character. The companion character data is stored for each of the companion characters. In the exemplary embodiment, the companion character data includes arrangement data and remaining time data. The arrangement data indicates the position and orientation of the corresponding companion character in the game space. The remaining time data indicates a remaining time until the aforementioned standby time elapses in the case where the companion character performs a skill motion (i.e., until a skill motion is allowed again).

Figure 17:
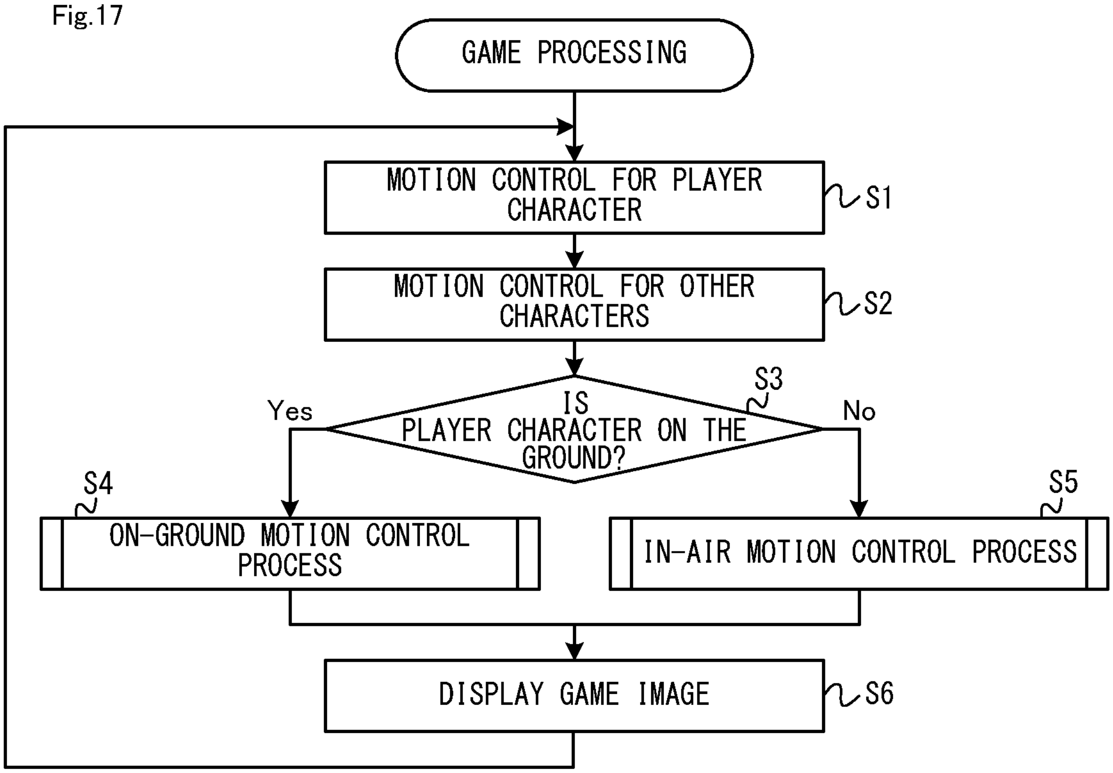
FIG. 17 is a flowchart showing an example of a flow of game processing executed by the non-limiting game system.

FIG. 17 is a flowchart showing an example of a flow of game processing executed by the game system 1. The game processing shown in FIG. 17 is started when an instruction to start the game has been made by the player during execution of the game program, for example.

Figure 18:
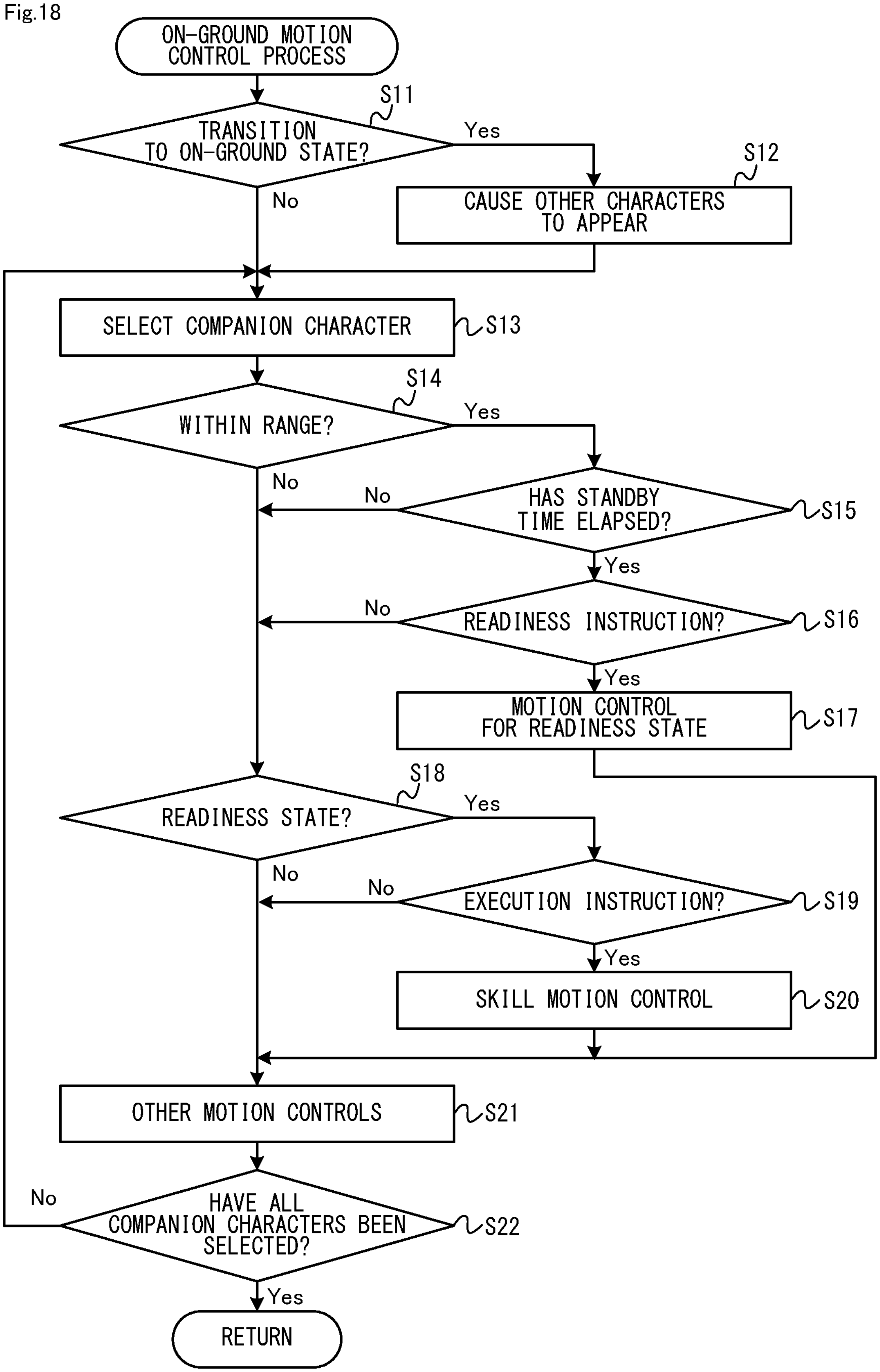
FIG. 18 is a flowchart showing an example of a specific flow of an on-ground motion control process in step S4 shown in FIG. 17.
Figure 19:
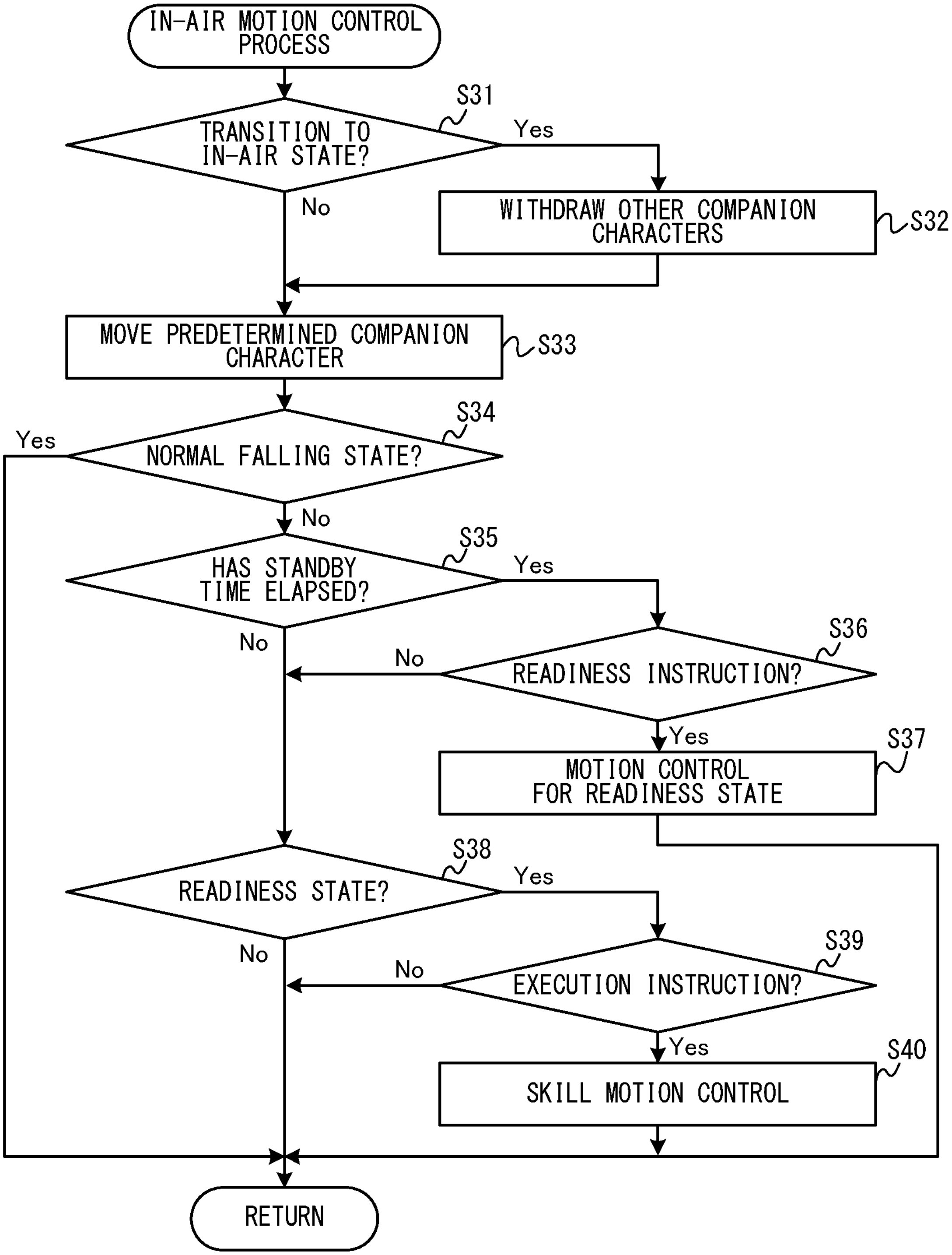
FIG. 19 is a sub flowchart showing an example of a specific flow of an in-air motion control process in step S5 shown in FIG. 17.

In the exemplary embodiment, the processor 81 of the main body apparatus 2 executes the game program stored in the game system 1 to execute the processes in steps shown in FIG. 17 to FIG. 19. However, in other embodiments, a part of the processes in the steps may be executed by a processor (e.g., a dedicated circuit, etc.) other than the processor 81. Furthermore, if the game system 1 is communicable with another information processing apparatus (e.g., a server), a part of the processes in the steps shown in FIG. 17 to FIG. 19 may be executed by the another information processing apparatus. The processes in the steps shown in FIG. 17 to FIG. 19 are merely examples, and the processing order of the steps may be changed or another process may be executed in addition to (or instead of) the processes in the steps as long as similar results can be obtained.

The processor 81 executes the processes in the steps shown in FIG. 17 to FIG. 19 by using a memory (e.g., the DRAM 85). That is, the processor 81 stores information (in other words, data) obtained in each process step into the memory, and reads out the information from the memory when using the information for the subsequent process steps.

In step S1 shown in FIG. 17, the processor 81 controls the motion of the player character, based on an operation input performed by the player. That is, the processor 81 acquires, at an appropriate timing, operation data received from the controllers via the controller communication section 83 and/or the terminals 17 and 21, and controls the motion of the player character, based on the acquired operation data. Thus, the player character moves in the game space, makes an instruction to a companion character, and performs an attack motion to an enemy character. In the case where the player character is in the aforementioned low-velocity falling state and a wind is generated by the skill motion of the companion character 202 (step S40 described later), the processor 81 moves the player character in the air while considering the influence of the wind. In addition, the processor 81 updates the state data included in the player character data stored in the memory such that the state data indicates the current state of the player character (i.e., any of the on-ground state, the normal falling state, the low-velocity falling state, and the diving falling state). Next to step S1, the process in step S2 is executed.

In step S2, the processor 81 controls the motions of characters (e.g., enemy character) other than the player character and the companion character. That is, the processor 81 controls the motions of the other characters according to the algorithm defined in the game program. Next to step S2, the process in step S3 is executed.

In step S3, the processor 81 determines whether or not the player character is positioned on the ground in the game space, based on the state data stored in the memory. When the determination result in step S3 is positive, the process in step S4 is executed. When the determination result in step S3 is negative, the process in step S5 is executed.

In step S4, the processor 81 executes an on-ground motion control process. The on-ground motion control process is a process of controlling the motion of a companion character when the player character is positioned on the ground. Hereinafter, the on-ground motion control process will be described in detail with reference to FIG. 18.

FIG. 18 is a sub flowchart showing an example of a specific flow of the on-ground motion control process in step S4 shown in FIG. 17. In the on-ground motion control process, firstly, in step S11, the processor 81 determines whether or not the player character has just transitioned from the state where it is positioned in the air to the state where it is positioned on the ground. This determination is performed based on whether or not an in-air motion control process in step S5 described later has been executed in the previous process loop of steps S1 to S5. When the determination result in step S11 is positive, the process in step S12 is executed. When the determination result in step S11 is negative, the process in step S12 is skipped and the process in step S13 is executed.

In step S12, the processor 81 causes companion characters (i.e., the companion characters 203 to 206 shown in FIG. 8) other than the companion character that performs the aforementioned skill motion of generating a wind (i.e., the companion character 202 shown in FIG. 8; hereinafter referred to as "predetermined companion character 202") to appear in the game space. Here, the other companion characters withdraw from the game space while the player character is positioned in the air (see step S32 described later). Therefore, the processor 81 causes the other companion characters to appear in the game space at the timing of step S12 that is the timing of transition from the state where the player character is positioned in the air to the state where it is positioned on the ground. The other companion characters may appear at any positions. For example, the processor 81 places the other companion characters at positions that satisfy a predetermined positional relationship with the player character. At this time, the processor 81 updates the arrangement data of the other companion characters stored in the memory such that the arrangement data indicate the positions at which the respective companion characters are placed. Next to step S12, the process in step S13 is executed.

In step S13, the processor 81 selects one companion character from among the companion characters appearing in the game space. At this time, the processor 81 selects a companion character that has not yet been selected in the process loop of steps S13 to S22 in the current on-ground motion control process. Next to step S13, the process in step S14 is executed.

In step S14, the processor 81 determines whether or not the companion character selected in step S13 is positioned within the aforementioned action range based on the player character. This determination can be performed based on the arrangement data included in the player character data stored in the memory and on the arrangement data included in the companion character data regarding the companion character, stored in the memory. When the determination result in step S14 is positive, the process in step S15 is executed. When the determination result in step S14 is negative, the process in step S18 described later is executed.

In step S15, the processor 81 determines whether or not the aforementioned standby time has elapsed from when the companion character selected in step S13 executed the previous skill motion. This determination is performed according to whether or not the remaining time data included in the companion character data stored in the memory with respect to the companion character indicates 0. When the determination result in step S15 is positive, the process in step S16 is executed. When the determination result in step S15 is negative, the process in step S18 described later is executed.

In step S16, the processor 81 determines, based on the operation data, whether or not an operation input for performing the aforementioned readiness instruction with respect to the companion character selected in step S13 has been performed by the player. When the determination result in step S16 positive, the process in step S17 is executed. When the determination result in step S16 is negative, the process in step S18 described later is performed.

In step S17, the processor 81 causes the companion character selected in step S13 to perform a motion to enter the readiness state (specifically, motion of going behind the player character, shown in FIG. 9). At this time, the processor 81 updates the arrangement data included in the companion character data stored in the memory with respect to the companion character such that the arrangement data indicates the content after the motion. Next to step S17, the process in step S21 is executed.

In step S18, the processor 81 determines whether or not the companion character selected in step S13 is in the readiness state. When the determination result in step S18 is positive, the process in step S19 is executed. When the determination result in step S18 is negative, the process in step S21 described later is executed.

In step S19, the processor 81 determines, based on the operation data, whether or not an operation input for performing the aforementioned execution instruction with respect to the companion character selected in step S13 has been performed by the player. When the determination result in step S19 is positive, the process in step S20 is executed. When the determination result in step S19 is negative, the process in step S21 described later is executed.

In step S20, the processor 81 causes the companion character selected in step S13 to perform the aforementioned skill motion (specifically, motion of generating a wind, shown in FIG. 10). At this time, the processor 81 updates the companion character data stored in the memory such that the data indicates the content after the motion. In addition, the processor 81 updates the remaining time data included in the companion character data stored in the memory such that the remaining time data indicates the length of the standby time. Thereafter, the processor 81 sequentially updates the remaining time data such that the time indicated by the remaining time data is decreased over time. Next to step S20, the process in step S21 is executed.

In step S21, the processor 81 controls a motion, other than the skill motion, of the companion character selected in step S13. For example, the processor 81 causes the companion character to perform a motion of moving according to movement of the player character, or a motion of attacking an enemy character according to the algorithm defined in the game program. At this time, the processor 81 updates the arrangement data included in the companion character data stored in the memory with respect to the companion character such that the arrangement data indicates the content after the motion. Next to step S21, the process in step S22 is executed.

In step S22, the processor 81 determines whether or not all the companion characters appearing in the game space have been selected in step S13 (i.e., whether or not all the companion characters have been subjected to movement control). When the determination result in step S22 is negative, the process in step S13 is again executed. Thereafter, the process loop of steps S13 to S22 is repeatedly executed until all the companion characters are selected in step S13. When the determination result in step S22 is positive, the processor 81 ends the on-ground motion control process.

In step S5 shown in FIG. 17, the processor 81 executes the in-air motion control process. The in-air motion control process is a process of controlling the motion of a companion character when the player character is positioned in the air. Hereinafter, the in-air motion control process will be described in detail with reference to FIG. 19.

FIG. 19 is a sub flowchart showing an example of a specific flow of the in-air motion control process in step S5 shown in FIG. 17. In the in-air motion control process, firstly, in step S31, the processor 81 determines whether or not the player character has just transitioned from the state where it is positioned on the ground to the state where it is positioned in the air. This determination is performed based on whether or not the on-ground motion control process in step S4 has been executed in the previous process loop of steps S1 to S5. When the determination result in step S31 is positive, the process in step S32 is executed. When the determination result in step S31 is negative, the process in step S32 is skipped and the process in step S33 is executed.

In step S32, the processor 81 withdraws the companion characters other than the predetermined companion character 202 from the game space. At this time, the processor 81 updates the arrangement data included in the companion character data regarding the withdrawn companion characters, stored in the memory, such that the arrangement data indicate that the companion characters are not placed in the game space. Next to step S32, the process in step S33 is executed.

In step S33, the processor 81 moves the predetermined companion character 202 according to movement of the player character. At this time, the processor 81 updates the arrangement data regarding the companion character, stored in the memory, such that the arrangement data indicates the position to which the predetermined companion character 202 has been moved. Next to step S33, the process in step S34 is executed.

In step S34, the processor 81 determines whether or not the player character is in the normal falling state, based on the state data in the player character data stored in the memory. When the determination result in step S34 is negative, the process in step S35 is executed. When the determination result in step S34 is positive, the processor 81 ends the in-air motion control process.

In step S35, the processor 81 determines whether or not the standby time has elapsed from when the predetermined companion character 202 executed the previous skill motion. This determination is performed according to whether or not the remaining time data included in the companion character data stored in the memory with respect to the predetermined companion character 202 indicates 0. When the determination result in step S35 is positive, the process in step S36 is executed. When the determination result in step S35 is negative, the processes in steps S36 to S37 are skipped and the process in step S38 described later is executed.

In step S36, the processor 81 determines, based on the operation data, whether or not an operation input for performing the readiness instruction with respect to the predetermined companion character 202 has been performed by the player. When the determination result in step S36 is positive, the process in step S37 is executed. When the determination result in step S36 is negative, the process in step S37 is skipped and the process in step S38 described later is executed.

In step S37, the processor 81 causes the predetermined companion character 202 to perform a motion to enter the readiness state. At this time, the processor 81 updates the arrangement data included in the companion character data stored in the memory with respect to the predetermined companion character 202 such that the arrangement data indicates the content after the motion. After step S37, the processor 81 ends the in-air motion control process.

In step S38, the processor 81 determines whether or not the predetermined companion character 202 is in the readiness state. When the determination result in step S38 is positive, the process in step S39 is executed. When the determination result in step S38 is negative, the processor 81 ends the in-air motion control process.

In step S39, the processor 81 determines, based on the operation data, whether or not an operation input for performing the execution instruction with respect to the predetermined companion character 202 has been performed by the player. When the determination result in step S39 is positive, the process in step S40 is executed. When the determination result in step S39 is negative, the processor 81 ends the in-air motion control process.

In step S40, the processor 81 causes the predetermined companion character 202 to perform the skill motion of generating a wind. The processor 81 updates the companion character data stored in the memory such that the data indicates the content after the motion. In addition, the processor 81 updates the remaining time data included in the companion character data stored in the memory such that the remaining time data indicates the length of the standby time. Thereafter, the processor 81 sequentially updates the remaining time data such that the time indicated by the remaining time data is decreased over time. After step S40, the processor 81 ends the in-air motion control process.

Next to the on-ground motion control process in step S4 or the in-air motion control process in step S5, the process in step S6 shown in FIG. 17 is executed. In step S6, the processor 81 generates a game image representing a game space, and causes the display device to display the game image. For example, the processor 81 generates a game image representing a game space including the player character, based on the position and the direction of the virtual camera controlled according to an operation input performed by the player. At this time, if a companion character is included in the game image, an image of the companion character is generated based on the companion character data in which the processing result in step S4 or S5 is reflected. If a readiness instruction to the companion character is possible, the processor 81 displays the readiness instruction image described above, together with the image of the game space (see FIG. 8). If an execution instruction to the companion character is possible, the processor 81 displays the execution instruction image described above, together with the image of the game space (see FIG. 9). If a companion character is positioned in the action range of the player character and the remaining time regarding the companion character is not 0, the processor 81 displays the remaining time image together with the image of the game space (see FIG. 11). During the game, a process loop of steps S1 to S5 is repeatedly executed once every predetermined time (e.g., 1 frame time), whereby the game image is updated so as to dynamically reflect the state of the game space. The display device on which the game image is displayed may be the display 12 described above, or may be another display device connected to the main body apparatus 2.

Next to step S26, the process in step S1 is executed again. Thereafter, during the game, the process loop of steps S1 to S6 is repeatedly executed. The game processing shown in FIG. 17 is ended when the game is ended. During the game, the game processing may be interrupted under a predetermined situation (e.g., when a moving image for representation of the game is reproduced).

[4. Functions and Effects of Exemplary Embodiment, and Modifications]

As described above, in the exemplary embodiment, the information processing system (specifically, the game system 1) is configured to include the following means (in other words, a game program as an example of an information processing program is configured to cause a computer to function as the following means).

Player character moving means that moves a player character on the ground and in the air in a virtual space, according to a first operation input performed by a user (step S1).

Non-player character moving means that moves a non-player character being an ally of the player character, in the virtual space, when the player character is positioned at least on the ground (step S21).

First control execution means that executes a first control (specifically, a control for causing a skill motion) associated with a predetermined character being a non-player character (specifically, the companion character 202), according to a second operation input (specifically, an input of pressing the A-button 53 twice) including an input performed in a state where a predetermined positional relationship is satisfied, the predetermined positional relationship indicating that the predetermined character and the player character are near to each other when the player character is positioned on the ground (step S20).

Second control execution means that executes a second control (specifically, a control for causing a skill motion) associated with the predetermined character, according to a third operation input (specifically, an input of pressing the A-button 53 twice) of the user, regardless of the positional relationship between the predetermined character and the player character, when the player character is positioned in the air (step S40).

According to the above configuration, when the player character is on the ground, the user can select a non-player character that executes the first control, by bringing the player character near to a desired non-player character. Meanwhile, when the player character is in the air, the user can cause the non-player character to execute the second control without moving the player character. Thus, when operating the player character moving on the ground and in the air, the user can easily cause the non-player character suited to the user's intention to perform a motion.

The second control execution means is not limited to means that constantly executes the second control while the player character is positioned in the air. The second control execution means may be, for example, means that executes the second control during a period in which a predetermined condition (in the above embodiment, the player character being in the low-velocity falling state) is satisfied while the player character is positioned in the air.

The third operation input may be an input according to the same input method as the second operation input as in the above embodiment, or may be an input according to an input method different from the second operation input. The second control may be a control of the same kind as the first control (in other words, a control providing the same kind of effect; a control for generating a wind in the above embodiment), or may be a control of a different kind from the first control. Each of the first control and the second control is a control for causing the non-player character to perform a certain motion in the above embodiment, but may be any control regarding the non-player character.

The "predetermined positional relationship indicating that the player character and the predetermined character are near to each other" indicates the relationship subject to the distance between the player character and the predetermined character, but is not limited to the relationship subject to the distance only. For example, the positional relationship may be a relationship subject to the orientation of the player character in addition to the distance between the player character and the predetermined character, as in the case where a companion character is positioned within the action range of the player character. Thus, the "predetermined positional relationship indicating that the player character and the predetermined character are near to each other" is not always satisfied even if the distance between the player character and the predetermined character is equal to or less than a predetermined value. Also, there may be a case that does not correspond to the above positional relationship even if the distance between the player character and the predetermined character is equal to or less than the predetermined value.

In the exemplary embodiment, the player character and a companion character as an example of a non-player character are not replaced with each other. However, in other embodiments, the player character and a non-player character may be replaced with each other.

In the exemplary embodiment, when a process is executed by using data (including a program) in a certain information processing apparatus, a part of the data required for the process may be transmitted from another information processing apparatus different from the certain information processing apparatus. In this case, the certain information processing apparatus may execute the process by using the data received from the another information processing apparatus and the data stored therein.

In other embodiments, the information processing system may not include some of the components in the above embodiment, and may not execute some of the processes executed in the above embodiment. For example, in order to achieve a specific effect of a part of the above embodiment, the information processing system may include a configuration for achieving the effect and execute a process for achieving the effect, and may not include other configurations and may not execute other processes.

The exemplary embodiment can be used as, for example, a game system and a game program for the purpose of, for example, easily performing an operation for causing a non-player character to perform a motion when operating a player character moving on the ground and in the air.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. A non-transitory computer-readable storage medium having stored therein instructions that, when executed, cause a processor of an information processing apparatus to execute game processing, comprising:

moving a player character on the ground and in the air in a virtual space, according to a first operation input of a user;

when the player character is positioned at least on the ground, moving, in the virtual space, a non-player character being an ally of the player character;

when the player character is positioned on the ground, executing a first control associated with a predetermined character being the non-player character, according to a second operation input including an input that is performed in a state where a predetermined positional relationship is satisfied, the predetermined positional relationship indicating that the predetermined character and the player character are near to each other; and when the player character is positioned in the air, executing a second control associated with the predetermined character, according to a third operation input of the user, regardless of the positional relationship between the predetermined character and the player character.

2. The non-transitory computer-readable storage medium according to claim 1, wherein the instructions, when executed, further:

move, in the virtual space, a plurality of non-player characters being allies of the player character and including the predetermined character, when the player character is positioned on the ground, execute a control associated with one non-player character among the plurality of non-player characters, according to the second operation input performed in a state where a predetermined positional relationship is satisfied, the predetermined positional relationship indicating that the one non-player character and the player character are near to each other, and when the player character is positioned in the air, do not execute a control associated with another non-player character different from the predetermined character even if the second operation input is performed.

3. The non-transitory computer-readable storage medium according to claim 2, wherein the instructions, when executed, further:

when the player character is positioned on the ground, move each of the plurality of non-player characters according to the position of the player character, and when the player character is positioned in the air, move the predetermined character according to the position of the player character, and do not move non-player characters, of the plurality of non-player characters, other than the predetermined character according to the position of the player character.

4. The non-transitory computer-readable storage medium according to claim 1, wherein the second control is a control having an influence on movement of the player character in the air.

5. The non-transitory computer-readable storage medium according to claim 4, wherein in the air, the player character is able to enter a first falling state, and a second falling state in which the player character falls at a velocity lower than that in the first falling state and moves by a larger amount in a horizontal direction in the game space as compared to the first falling state, and when the player character is in the second falling state in the air, the player character is controlled so as to move under the influence of the second control.

6. The non-transitory computer-readable storage medium according to claim 4, wherein execution of a new first control corresponding to the predetermined character is allowed on condition that a predetermined time elapses from execution of the first control or the second control, and execution of a new second control corresponding to the predetermined character is allowed on condition that a predetermined time elapses from execution of the first control or the second control.

7. The non-transitory computer-readable storage medium according to claim 4, wherein the first control and the second control both are a control for generating a movement force that moves an object.

8. The non-transitory computer-readable storage medium according to claim 7, wherein the instructions, when executed, further:

when the player character is positioned on the ground, do not move the player character based on the movement force generated by the first control, and when the player character is positioned in the air, move the player character based on the movement force generated by the second control.

9. The non-transitory computer-readable storage medium according to claim 7, wherein the first control is a control for generating the movement force at a predetermined height with reference to the player character, and the second control is a control for generating the movement force at a height lower than the predetermined height with reference to the player character.

10. The non-transitory computer-readable storage medium according to claim 1, wherein the second operation input and the third operation input both include an input to a predetermined operation part.

11. The non-transitory computer-readable storage medium according to claim 10, wherein the second operation input and the third operation input both include two times of the input to the predetermined operation part.

12. An information processing system comprising one or more processors, the one or more processors executing:

moving a player character on the ground and in the air in a virtual space, according to a first operation input of a user;

when the player character is positioned at least on the ground, moving, in the virtual space, a non-player character being an ally of the player character;

when the player character is positioned on the ground, executing a first control associated with a predetermined character being the non-player character, according to a second operation input including an input that is performed in a state where a predetermined positional relationship is satisfied, the predetermined positional relationship indicating that the predetermined character and the player character are near to each other; and when the player character is positioned in the air, executing a second control associated with the predetermined character, according to a third operation input of the user, regardless of the positional relationship between the predetermined character and the player character.

13. A game processing method executed by an information processing system, the information processing system executing:

moving a player character on the ground and in the air in a virtual space, according to a first operation input of a user;

when the player character is positioned at least on the ground, moving, in the virtual space, a non-player character being an ally of the player character;

when the player character is positioned on the ground, executing a first control associated with a predetermined character being the non-player character, according to a second operation input including an input that is performed in a state where a predetermined positional relationship is satisfied, the predetermined positional relationship indicating that the predetermined character and the player character are near to each other; and when the player character is positioned in the air, executing a second control associated with the predetermined character, according to a third operation input of the user, regardless of the positional relationship between the predetermined character and the player character.

* * * * *